United States Patent
Jiang et al.

(10) Patent No.: US 11,522,588 B1
(45) Date of Patent: Dec. 6, 2022

(54) APPARATUS, SYSTEM, AND METHOD FOR ADAPTIVE BEAMFORMING IN WIRELESS NETWORKS

(71) Applicant: Meta Platforms, Inc., Menlo Park, CA (US)

(72) Inventors: Lisi Jiang, Irvine, CA (US); Ahmed Gamal Helmy Mohamed, Mountain View, CA (US); Brian Dunn, Menlo Park, CA (US); Po Han Huang, Menlo Park, CA (US); Krishna Srikanth Gomadam, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/242,334

(22) Filed: Apr. 28, 2021

(51) Int. Cl.
| | |
|---|---|
| *H04B 7/06* | (2006.01) |
| *H04B 7/0408* | (2017.01) |
| *H04B 7/0456* | (2017.01) |
| *H04B 17/345* | (2015.01) |

(52) U.S. Cl.
CPC ........... *H04B 7/061* (2013.01); *H04B 7/0408* (2013.01); *H04B 7/0456* (2013.01); *H04B 7/0695* (2013.01); *H04B 17/345* (2015.01)

(58) Field of Classification Search
CPC .... H04B 7/061; H04B 17/345; H04B 7/0408; H04B 7/0456; H04B 7/0695; H04B 7/0617; H04W 88/04
See application file for complete search history.

(56) References Cited

U.S. PATENT DOCUMENTS

| | | | |
|---|---|---|---|
| 2017/0230910 A1* | 8/2017 | Kimura | H04L 43/16 |
| 2018/0062721 A1* | 3/2018 | Cho | H04W 72/082 |
| 2018/0302129 A1 | 10/2018 | Athley et al. | |
| 2020/0112420 A1* | 4/2020 | Xu | H04W 72/0446 |
| 2020/0395993 A1* | 12/2020 | Ryu | H04B 7/088 |

FOREIGN PATENT DOCUMENTS

| | | | |
|---|---|---|---|
| WO | WO-2018143995 A1 * | 8/2018 | |
| WO | 2019122972 A1 | 6/2019 | |
| WO | WO-2021089662 A1 * | 5/2021 | |
| WO | WO-2021122114 A1 * | 6/2021 | |

OTHER PUBLICATIONS

Hisilicon Huawei, "Spatial Emission and Interference Mitigation," 3GPP Draft, R4-2010489, 3rd Generation Partnership Project (3GPP), Aug. 7, 2020, 4 pages.
International Search Report and Written Opinion for International Application No. PCT/US2022/026527, dated Aug. 2, 2022, 13 pages.

* cited by examiner

*Primary Examiner* — Sophia Vlahos
(74) *Attorney, Agent, or Firm* — FisherBroyles, LLP

(57) ABSTRACT

A system comprising a plurality of nodes communicatively coupled to one another via at least one wireless link and a controller communicatively coupled to at least one of the nodes, wherein the controller (1) coordinates at least one scan that measures interference introduced into the wireless link, (2) identifies, based at least in part on the scan, one or more characteristics of the wireless link, (3) determines, based at least in part on the characteristics of the wireless link, that the node is eligible for a tapered codebook that, when implemented, modifies at least one feature of an antenna array that supports the wireless link in connection with the node, and then (4) directs the node to implement the tapered codebook. Various other apparatuses, systems, and methods are also disclosed.

20 Claims, 11 Drawing Sheets

APPARATUS, SYSTEM, AND METHOD FOR ADAPTIVE BEAMFORMING IN WIRELESS NETWORKS

INCORPORATION BY REFERENCE

This application incorporates by reference U.S. application Ser. No. 16/877,857 filed 19 May 2020 in its entirety as well as U.S. application Ser. No. 16/877,877 filed 19 May 2020 in its entirety.

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

Figure 1:
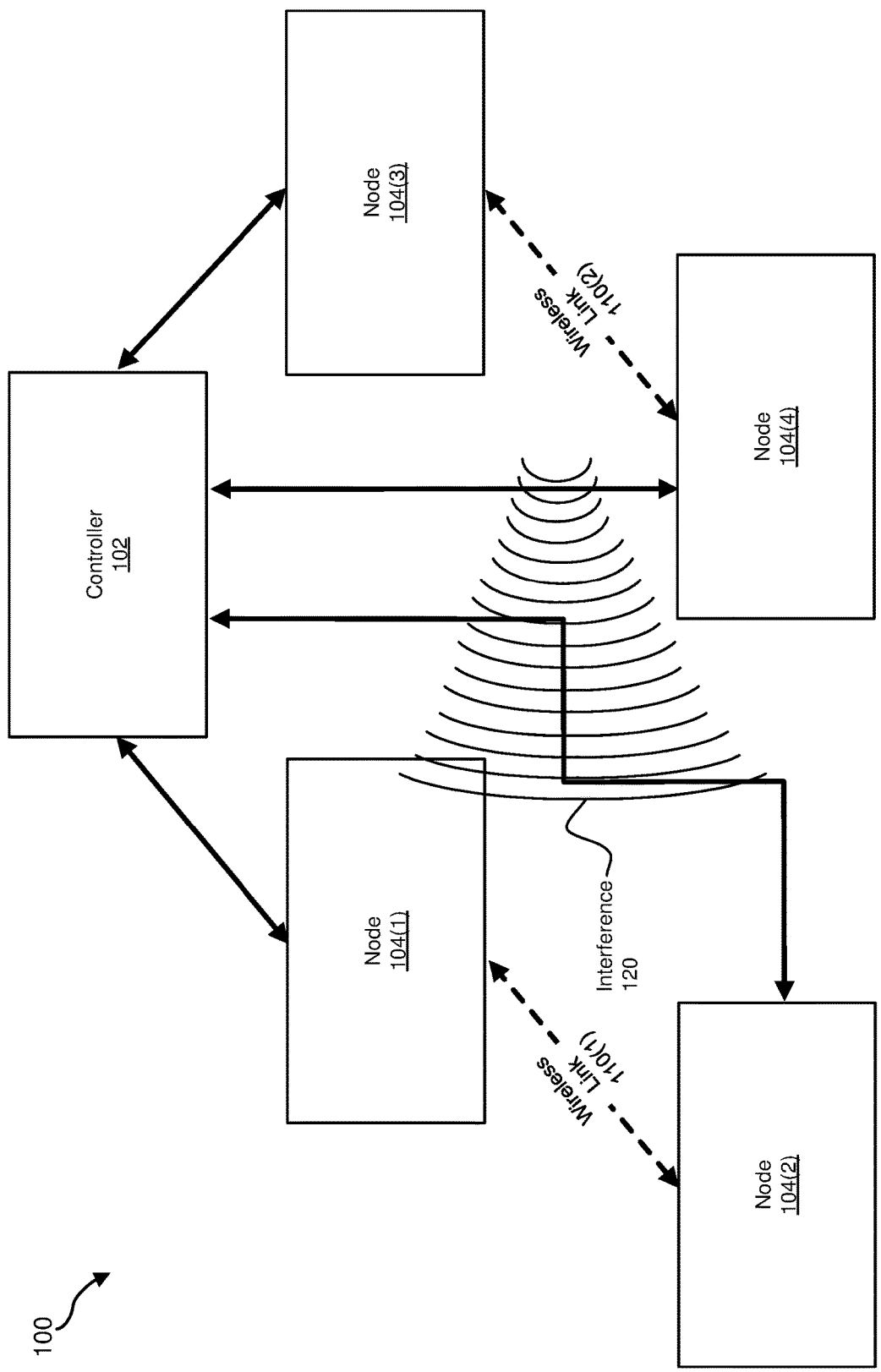
FIG. 1 is a block diagram of an exemplary system for adaptive beamforming in a wireless network according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to adaptive beamforming in wireless networks. As will be explained in greater detail below, these apparatuses, systems, and methods may provide numerous features and benefits.

In some examples, wireless mesh networks may include and/or represent various nodes capable of communicating with one another via wireless links. In these examples, the nodes may be located proximate to one another, or at least within a certain range of one another, to support connections and/or communication via such wireless links. Unfortunately, some of these wireless links within the wireless mesh network may suffer from interference introduced by other wireless links within the wireless mesh network. Such interference may degrade, impair, and/or obstruct the performance of individual wireless links and/or the wireless mesh network as a whole.

To mitigate the effect of such interference on the wireless links, the wireless mesh network may implement certain beamforming techniques in antenna arrays on those nodes. For example, a controller may direct nodes within the wireless mesh network to implement an innovative antenna grouping scheme that beamforms the corresponding antenna arrays such that their sidelobes are suppressed by approximately 17 decibels. In this example, the sidelobe suppression of approximately 17 decibels may serve to mitigate and/or decrease the amount of interference introduced by the nodes' antenna arrays. Unfortunately, this antenna grouping scheme may invoke a tradeoff in which the mainlobe of each antenna array loses approximately 1 decibel of signal power—for a total loss of 2 decibels per wireless link.

Accordingly, this antenna grouping scheme may mitigate and/or decrease the amount of interference introduced within the wireless mesh network, thus improving its performance, if the wireless links are able to sustain the 2-decibel signal loss. However, if the wireless links are not able to sustain such a 2-decibel signal loss (due, e.g., to the distance between the corresponding nodes and/or weather conditions), this antenna grouping scheme may potentially cause more harm than good to the wireless mesh network. Therefore, to achieve optimal performance, the wireless mesh network may need to implement the antenna grouping scheme only when certain conditions exist and/or are satisfied. The instant disclosure, therefore, identifies and addresses a need for additional apparatuses, systems, and methods for adaptive beamforming in wireless networks.

As will be described in greater detail below, a controller for a wireless mesh network may coordinate, initiate, and/or perform a scan that measures interference introduced into wireless links that communicatively couple nodes within the wireless mesh network to one another. In some examples, the controller may identify certain characteristics of the wireless links based at least in part on the scan. The controller may then determine whether certain nodes within the wireless mesh network are eligible for a tapered codebook (meaning, e.g., that the tapered codebook is likely to improve—as opposed to impair—performance within the wireless mesh network). In one example, when implemented, the tapered codebook may effectively modify one or more features of the corresponding antenna arrays on those nodes. Examples of such features include, without limitation, angular directions of antenna tiles included in antenna arrays of nodes, beamformers associated with antenna arrays of nodes, phase shifters associated with antenna arrays of nodes, gain controllers associated with antenna arrays of nodes, combinations or variations of one or more of the same, and/or any other suitable features of antenna arrays.

In one example, if the nodes are eligible for the tapered codebook, the controller may direct the nodes to implement and/or apply the tapered codebook. As a result of implementing and/or applying the tapered codebook on the nodes, the corresponding antenna arrays may beamform in such a way that (1) suppresses the sidelobes by approximately 17 decibels, thereby mitigating and/or decreasing the amount of interference introduced by the antenna arrays, and (2) loses approximately 2 decibels of signal power per wireless link. However, if the nodes are not eligible for the tapered codebook, the controller may direct the nodes to implement and/or apply a traditional non-tapered codebook so as to avoid losing communication via any wireless links involving mainlobes that are unable to sustain a 2-decibel signal loss. Accordingly, the controller may direct the nodes to implement the best codebook for the situation in an effort to optimize the wireless mesh network's performance.

Thus, the various apparatuses, systems, and methods disclosed herein may achieve and/or strike the optimal balance between sidelobe suppression and mainlobe gain maximization. In one example, these apparatuses, systems, and methods may be able to predict and/or estimate the angular location of the high-level sidelobes via an offline prediction algorithm (e.g., a Monte Carlo algorithm). In this example, these apparatuses, systems, and methods may make codebook-switching decisions based on the predicted and/or estimated locations of the high-level sidelobes and the budget of the corresponding wireless link(s).

The following will provide, with reference to FIGS. 1-7, detailed descriptions of exemplary devices, systems, components, and corresponding implementations for adaptive beamforming in wireless networks. Detailed descriptions of exemplary graphs showing predicted sidelobe angles and/or locations based on an offline prediction algorithm (e.g., a Monte Carlo algorithm) will be provided in connection with FIGS. 8-10. In addition, detailed descriptions of exemplary methods for adaptive beamforming in wireless networks will be provided in connection with FIG. 11.

FIG. 1 illustrates an exemplary system 100 capable of facilitating adaptive beamforming in a wireless network. In some examples, system 100 may itself constitute, represent, and/or form the wireless network. As illustrated in FIG. 1, exemplary system 100 may include and/or represent a controller 102 and nodes 104(1)-(4). In some examples, nodes 104(1) and 104(2) may be communicatively coupled to one another via a wireless link 110(1), and nodes 104(3) and 104(4) may be communicatively coupled to one another via a wireless link 110(2). Accordingly, system 100 may constitute and/or represent all or a portion of a wireless network (e.g., a wireless mesh network). In such examples, controller 102 may be communicatively coupled to one or more of nodes 104(1)-(4) and/or may perform one or more tasks and/or operations that support and/or enable adaptive beamforming within the wireless network.

In some examples, controller 102 may coordinate, initiate, and/or perform a scan that measures interference 120 introduced by wireless link 110(2) into wireless link 110(1). In one example, the scan coordinated by controller 102 may involve collecting data, statistics, measurements, and/or information about interference 120 from one or more of nodes 104(1)-(4). Accordingly, while certain portions of the scan may be initiated and/or performed by controller 102, other portions of the scan may be initiated and/or performed by one or more of nodes 104(1)-(4).

In one example, controller 102 may identify certain characteristics of wireless link 110(1) and/or wireless link 110(2) based at least in part on the scan. In this example, wireless link 110(1) may be the victim of interference 120, and wireless link 110(2) may be the aggressor of interference 120. Examples of characteristics of wireless links 110(1) and 110(2) include, without limitation, an Interference-to-Noise Ratio (INR) for the victim or aggressor wireless link, a Signal-to-Noise Ratio (SNR) for the victim or aggressor wireless link, an angle of arrival for the interference at a receiver node in the victim or aggressor wireless link, an angular direction of at least one sidelobe of a receive beam associated with the receiver node in the victim or aggressor wireless link, a gain of a mainlobe of the receive beam associated with the receiver node in the victim or aggressor wireless link, an angle of departure for the interference at a transmitter node in the victim or aggressor wireless link, an angular direction of at least one sidelobe of a transmit beam associated with the transmitter node in the victim or aggressor wireless link, a gain of a mainlobe of the transmit beam associated with the transmitter node in the victim or aggressor wireless link, combinations or variations of one or more of the same, and/or any other suitable characteristics of such wireless links.

In some examples, controller 102 may determine whether any of nodes 104(1)-(4) are eligible for a tapered codebook based at least in part on the characteristics of wireless link 110(1) and/or wireless link 110(2). In one example, a node may be eligible for the tapered codebook if its corresponding wireless link is able to sustain a certain amount of signal loss (e.g., approximately 2 decibels of total signal loss) without affecting connectivity and/or communication. For example, the tapered codebook may be configured, designed, and/or intended to mitigate and/or decrease the amount of interference introduced by the node's antenna array. Specifically, the tapered codebook may cause the node's antenna array to suppress its sidelobes by a certain amount (e.g., approximately 17 decibels) compared to a non-tapered codebook. This suppression of the antenna array's sidelobes may cause and/or effectuate a decrease in the amount interference emitted by the antenna array.

In some examples, a tradeoff of this decrease in interference may be a certain amount (e.g., 1 decibel) of signal loss from the mainlobe of the node's antenna array. In one example, to sustain this amount of signal loss, the corresponding wireless link may need to be strong enough to support the continuation of connectivity and/or communication despite the resulting signal loss in the mainlobe of the transmitter node's antenna array and/or the mainlobe of the receiver node's antenna array. In other words, to sustain this amount of signal loss, the receiver node may need to be positioned and/or located such that its receive beam extends to and/or within the range and/or reach of the transmit beam emitted by the corresponding transmitter node. For example, to be eligible for the tapered codebook, the receiver and transmitter nodes may need to be positioned and/or located such that the transmit beam emitted by the transmitter node will still extend to and/or reach the receive beam emitted by the receiver node despite a 2-decibel signal loss (e.g., a 1-decibel loss per beam).

In some examples, to achieve the suppression of antenna array's sidelobes, the tapered codebook may modify one or more features of the antenna array. Examples of such features include, without limitation, an angular direction of at least one antenna tile included in an antenna array, a beamformer associated with an antenna array, a phase shifter associated with an antenna array, a gain controller associated with an antenna array, combinations or variations of one or more of the same, and/or any other suitable features of an antenna array.

In some examples, controller 102 may direct any or all of the eligible nodes to implement and/or apply the tapered codebook in response to determining that such nodes are eligible for the tapered codebook. In one example, the tapered codebook and/or the non-tapered codebook may be installed and/or stored on nodes 104(1)-(4). In this example, controller 102 may direct the eligible nodes to switch from the non-tapered codebook, which is activated by default, to the tapered codebook. In another example, controller 102 may transmit the tapered codebook to the eligible nodes for implementation upon determining that such nodes are eligible for the tapered codebook.

In some examples, the tapered codebook may include and/or represent one or more instructions that cause the implementing nodes to configure their antenna arrays in accordance with a certain antenna grouping scheme. In one example, this antenna grouping scheme may enable the antenna arrays to suppress at least one sidelobe of the antenna arrays by approximately 17 decibels. In this example, this antenna grouping scheme may have a side effect of decreasing the transmit or receive beam of the antenna arrays by approximately 2 decibels across the corresponding wireless links. Additionally or alternatively, this antenna grouping scheme may involve configuring and/or modifying the angular direction of one or more antenna tiles included in such antenna arrays.

Figure 7:
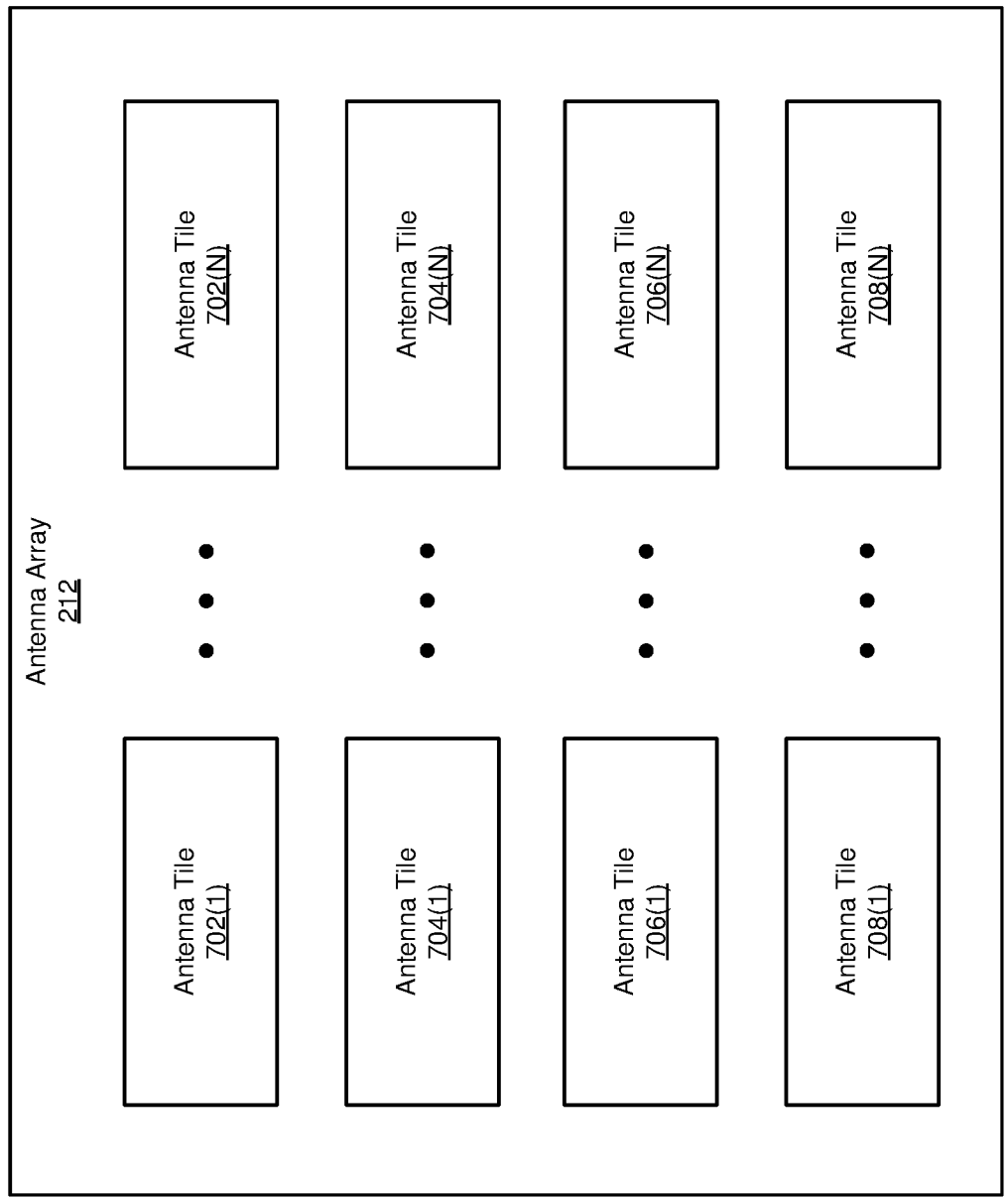
FIG. 7 is a block diagram of an exemplary antenna array according to one or more embodiments of this disclosure.

FIG. 7 illustrates an exemplary antenna array 212 that includes various antenna tiles 702(1)-(N), 704(1)-(N), 706(1)-(N), and 708(1)-(N). In one example, the tapered codebook may program and/or configure antenna array 212 according to the antenna grouping scheme. In this example, as part of the antenna grouping scheme, antenna array 212 may arrange, aim, and/or modify one or more of antenna tiles 702(1)-(N), 704(1)-(N), 706(1)-(N), and 708(1)-(N) in one way or another to achieve a certain objective. Similarly, the non-tapered codebook may program and/or configure antenna array 212 according to a different antenna grouping scheme. In this example, as part of the different antenna grouping scheme, antenna array 212 may arrange, aim, and/or modify one or more of antenna tiles 702(1)-(N), 704(1)-(N), 706(1)-(N), and 708(1)-(N) in one way or another to achieve a different objective.

Figure 2:
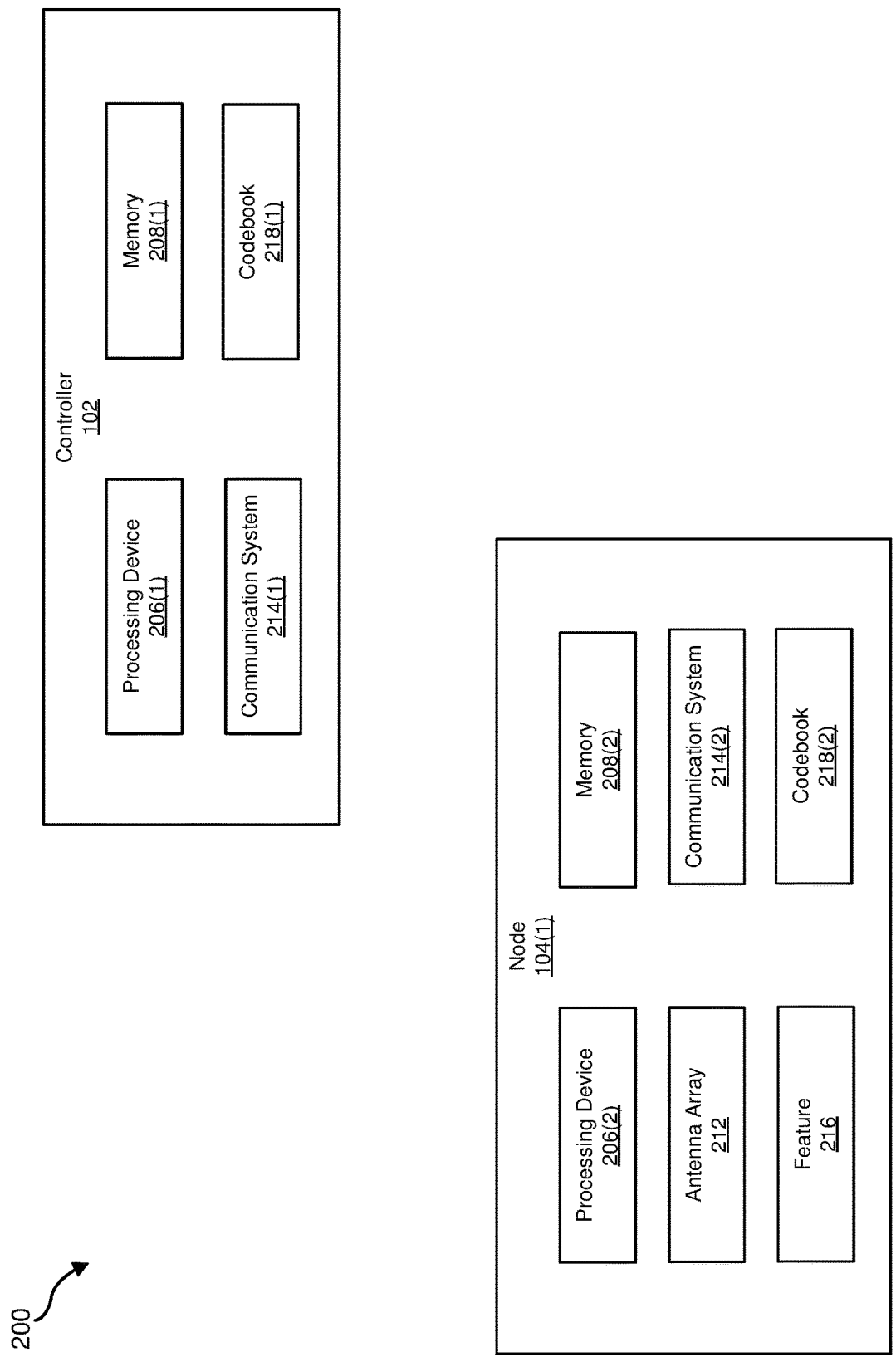
FIG. 2 is a block diagram of an exemplary controller and an exemplary node that facilitate adaptive beamforming in a wireless network according to one or more embodiments of this disclosure.

FIG. 2 illustrates an exemplary implementation 200 of controller 102 and node 104(1). As illustrated in FIG. 2, controller 102 may include and/or represent a processing device 206(1), memory 208(1), a communication system 214(1), and/or a codebook 218(1). Additionally or alternatively, node 104(1) may include and/or represent a processing device 206(2), memory 208(2), a communication system 214(2), a codebook 218(2), an antenna array 212, and/or a feature 216. In some embodiments, controller 102 and/or node 104(1) may also include and/or represent one or more additional devices, components, circuits, and/or features that are not necessarily illustrated in FIG. 2. Although FIG. 2 illustrates only controller 102 and node 104(1), the other nodes illustrated in FIG. 1 may include and/or represent any or all of the same devices components, circuits, and/or features as node 104(1).

Processing devices 206(1) and 206(2) may each include and/or represent any type or form of hardware-implemented processing device capable of interpreting and/or executing computer-readable instructions. In one example, processing devices 206(1) and 206(2) may access and/or modify certain software modules, applications, and/or data stored in memory (e.g., memory 208(1) or 208(2)). In this example, processing devices 206(1) and 206(2) may execute and/or launch one or more software modules stored in memory to facilitate adaptive beamforming in wireless networks. Examples of processing devices 206(1) and 206(2) include, without limitation, physical processors, central processing units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable processing devices.

Memories 208(1) and 208(2) may each include and/or represent any type or form of volatile or non-volatile storage device or medium capable of storing data, computer-readable instructions, software modules, applications, and/or operating systems. Examples of memories 208(1) and 208(2) include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory devices. Although illustrated as separate devices in FIG. 2, certain processing devices and memories may, in some embodiments, be considered and/or viewed as a single device and/or unit.

Antenna array 212 may include and/or represent circuitry and/or antennae configured to facilitate wireless communication and/or pairing. For example, antenna array 212 may enable node 104(1) to connect and/or communicate with node 104(2) via wireless link 110(1). In one example, antenna array 212 may include and/or represent multiple antenna tiles and/or elements combined and/or incorporated into a single unit. In this example, the single unit formed by antenna array 212 may constitute and/or represent a directional antenna system capable of beamforming and/or spatial filtering in connection with transmitting and/or receiving communications. Additional examples of antenna array 212 include, without limitation, Radio Frequency (RF) modules, WiFi modules, Bluetooth modules, portions of one or more of the same, variations or combinations of one or more of the same, and/or any other suitable communication system.

Communication systems 214(1) and 214(2) may each include and/or represent circuitry, cabling, and/or antennae configured to facilitate communication and/or server-client relationships. For example, communication systems 214(1) and 214(2) may enable controller 102 to connect and/or communicate with node 104(1). Additionally or alternatively, communication systems 214(1) may enable controller 102 to connect and/or communicate with one or more of nodes 104(2)-(4). In some examples, communication systems 214(1) and 214(2) may include and/or represent one or more communication ports, Ethernet cabling, fiber optic cabling, and/or wireless communication elements (e.g., antennae), among other hardware features or components. Additional examples of communication systems 214(1) and 214(2) include, without limitation, Radio Frequency (RF) modules, WiFi modules, portions of one or more of the same, variations or combinations of one or more of the same, and/or any other suitable communication systems.

Codebooks 218(1) and 218(2) may each include and/or represent a tapered codebook and/or a non-tapered codebook. In some examples, codebooks 218(1) and 218(2) may each include and/or represent one or more instructions that, when executed by a certain node, cause the node to configure its antenna array in accordance with a certain antenna grouping scheme. In one example, the antenna grouping scheme may enable antenna array 212 to suppress at least one of its sidelobes by approximately 17 decibels. In this example, this antenna grouping scheme may have a side effect of decreasing the transmit or receive beam of antenna array 212 by approximately 2 decibels across the corresponding wireless link.

Feature 216 may include and/or represent one or more elements, components, configurations, and/or settings of antenna array 212. In one example, feature 216 may be integrated and/or incorporated into antenna array 212. In another example, feature 216 may be external to, linked to, and/or associated with antenna array 212. In this example, feature 216 may affect and/or control the performance, direction, phase, and/or gain of antenna array 212. Examples of feature 216 include, without limitation, the angular directions of antenna tiles included in antenna array 212, beamformers associated with antenna array 212, phase shifters associated with antenna array 212, gain controllers associated with antenna array 212, combinations or variations of one or more of the same, and/or any other suitable feature of antenna array 212.

Figure 3:
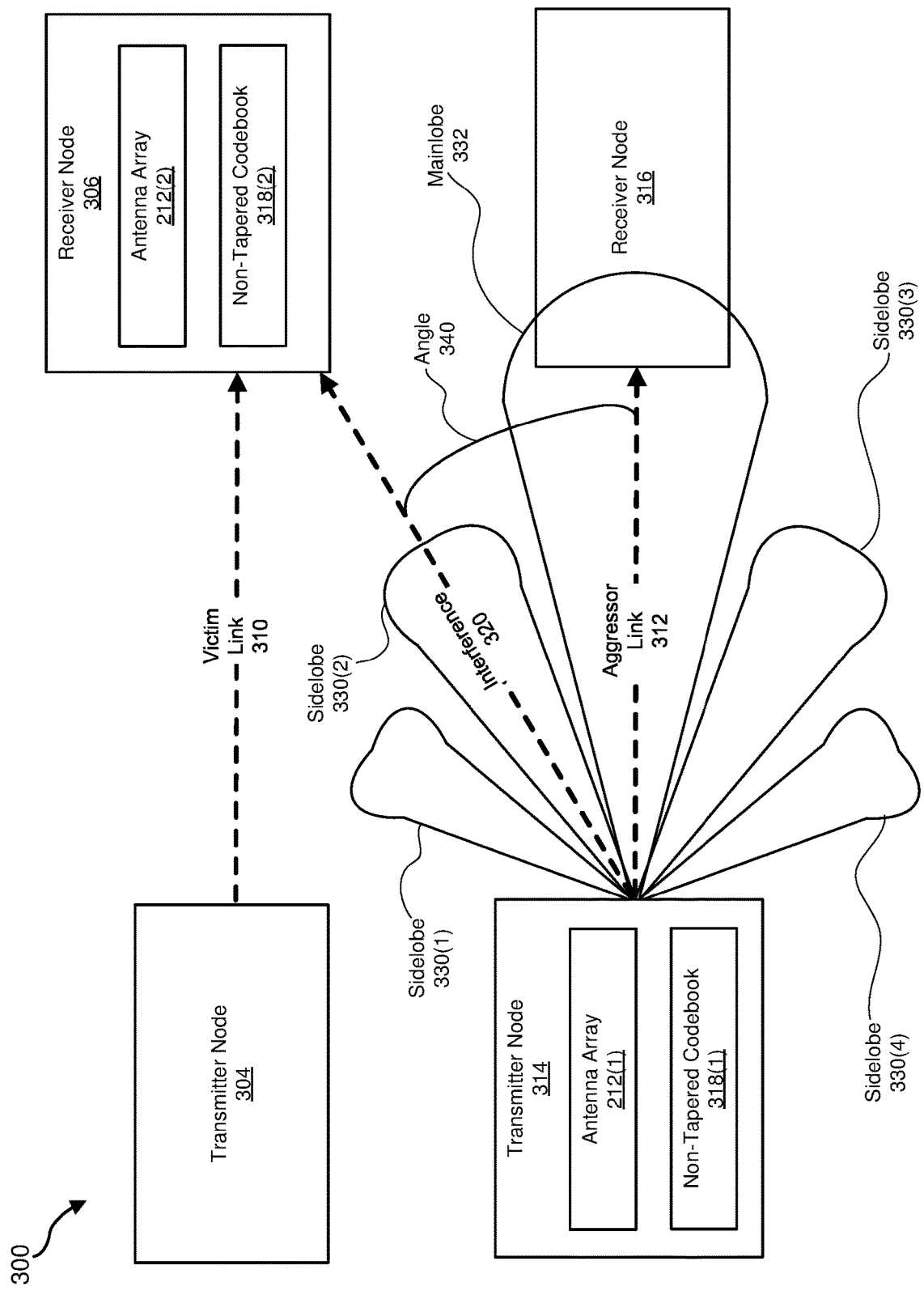
FIG. 3 is a block diagram of an exemplary system for adaptive beamforming in a wireless network according to one or more embodiments of this disclosure.

FIG. 3 illustrates an exemplary system 300 capable of facilitating adaptive beamforming in a wireless network. In some examples, system 300 may include and/or represent a specific configuration and/or arrangement of nodes 104(1)-(4) illustrated in FIG. 1. As illustrated in FIG. 3, system 300 may include and/or represent a transmitter node 304 and a receiver node 306 communicatively coupled via a victim link 310. In addition, system 300 may include and/or represent a transmitter node 314 and a receiver node 316 communicatively coupled via an aggressor link 312. In some embodiments, aggressor link 312 may emit and/or introduce interference into victim link 310. Unfortunately, such interference may degrade, impair, and/or obstruct the performance of individual victim link 310 and/or the corresponding wireless network as a whole.

Some or all of the nodes in FIG. 3 may implement and/or apply a non-tapered codebook by default. For example, transmitter node 314 may implement a non-tapered codebook 318(1) that configures one or more features of an antenna array 212(1) by default and/or upon bootup. In this example, non-tapered codebook 318(1) may cause transmitter node 314 and/or antenna array 212(1) to beamform in a way that does not involve suppressing the sidelobes by approximately 17 decibels.

In another example, receiver node 306 may implement a non-tapered codebook 318(2) that configures one or more features of an antenna array 212(2) by default and/or upon bootup. In this example, non-tapered codebook 318(2) may cause receiver node 306 and/or antenna array 212(1) to beamform in a way that does not involve suppressing the sidelobes by approximately 17 decibels. Accordingly, non-tapered codebooks 318(1) and 318(2) may each constitute and/or represent a traditional configuration that serves as a reference and/or baseline for the amount of sidelobe suppression achieved by a counterpart tapered codebook.

In some examples, the non-tapered codebook may not sacrifice the amount of signal loss in the mainlobe of the transmit or receive beam for the amount of signal suppression in the sidelobes of the transmit or receive beam. In other words, the non-tapered codebook may avoid the gain suppression and/or loss provided by the counterpart tapered codebook. In such examples, the amount of signal loss in the mainlobe of the transmit or receive beam may be much less than the amount of signal suppression in the sidelobe of the transmit or receive beam. In one example, upon implementation, the tapered codebook may cause the implementing node to sacrifice that amount of signal loss in the mainlobe of the transmit or receive beam for the amount of signal suppression in the sidelobe of the transmit or receive beam.

In some examples, controller 102 may identify, detect, and/or determine which links are aggressors and/or which links are victims with respect to interference. In one example, controller 102 may determine that aggressor link 312 is interfering with victim link 310 based at least in part on the relative angles between link and/or lobe directions as well as the known characteristics of the corresponding beamforming patterns. In this example, the majority of energy propagating from one node to another through a wireless link may be contained within the mainlobe of the beamforming pattern. On the one hand, the smaller the angle between the direction of aggressor link 312 and the direction of the interference link, the greater the interference introduced from aggressor link 312 to victim link 310 may be. On the other hand, the larger the angle between the direction of aggressor link 312 and the direction of the interference link, the smaller the interference introduced from aggressor link 312 to victim link 310 may be.

In some examples, system 300 in FIG. 3 may demonstrate a configuration and/or arrangement in which the nodes are positioned and/or located such that an angle 340 forms between aggressor link 312 and interference 320. In one example, transmitter node 314 may generate and/or emit a beamforming pattern via antenna array 212(1). This beamforming pattern may include and/or represent a mainlobe 332 and/or sidelobes 330(1), 330(2), 330(3), and 330(4). As illustrated in FIG. 3, sidelobe 330(2) may be directed toward receiver node 306 and/or aligned with interference 320. In this example, angle 340 between the directions of interference 320 and aggressor link 312 may be relatively large. As a result, sidelobe 330(2) may be the primary contributor to interference 320 among the beamforming pattern. Since the majority of the signal energy is contained within mainlobe 332 of the beamforming pattern, angle 340 being relatively large may weaken interference 320 and thus improve the performance of victim link 310 (compared to, e.g., angle 440 in FIG. 4).

In some examples, controller 102 may know, identify, and/or discover various characteristics about the nodes and/or their corresponding links. For example, the nodes may be fixed and/or secured at specific locations, and controller 102 may know, identify and/or discover such locations. Additionally or alternatively, the antenna arrays of the nodes may be oriented and/or aimed in specific directions, and controller 102 may know, identify and/or discover such locations. Accordingly, the nodes and/or their antenna arrays may have relative angular relationships with one another, and controller 102 may know, identify, and/or discover such angular relationships and/or which nodes are wirelessly linked to one another via their antenna arrays.

In some examples, controller 102 may identify and/or determine which of the links is the aggressor and which of the links is the victim based at least in part on interference measurements. For example, controller 102 may determine that interference 320 and/or the corresponding INR is above or below a certain threshold. In this example, the INR may include and/or represent an estimate based on the aggressor node's maximum transmit power and/or average transmit power.

In some examples, one or more devices included in system 300 may perform Interference Measurement (IM) scans (sometimes referred to as beam scans) to measure interference introduced by the aggressor link into the victim link. For example, controller 102 may coordinate IM scans across the nodes in system 300 and/or the corresponding wireless mesh network. This coordination may involve selecting beamforming settings that generate varying beamforming patterns. In one example, an IM scan may involve sequentially switching through the different beamforming patterns while transmitter node 314 is transmitting wireless signals to receiver node 316 via aggressor link 312. In this example, the IM scan may engage and/or activate each possible beamforming setting throughout the switching.

In some examples, controller 102 may coordinate wireless reception of receiving node 306 so that interference 320 caused by wireless signals transmitted through each of the scanned beamforming settings of transmitter node 314 node are measured. In one example, controller 102 and/or receiver node 306 may measure interference 320 with or without transmitter node 304 transmitting wireless signals to receiver node 306. For example, receiver node 306 may measure an INR while transmitter node 314 scans through a set of beams and transmitter node 314 is inactive. Additionally or alternatively, receiver node 306 may determine a Signal-to-Noise plus Interference Ratio (SINR) based at least in part on the INR. In this example, controller 102 may coordinate transmission of wireless signals by transmitter node 304 while transmitter node 314 scans through the set of beams. In this case, the wireless signals received from transmitter node 304 may represent the desired signals, and the wireless signals received from transmitter node 314 may represent interference introduced into victim link 310.

In some examples, controller 102 may obtain and/or collect the interference measurements (e.g., INR and/or SINR) corresponding to the different beamforming settings of the scan from one or more of the nodes included in system 300. Additionally or alternatively, controller 102 may obtain and/or collect additional information about the interference measured across the different beamforming settings of the scan. Examples of such information about the interference include, without limitation, angles of arrival for the interference at a receiver node in the victim or aggressor wireless link, angular directions of sidelobes in a receive beam associated with the receiver node in the victim or aggressor wireless link, gains of a mainlobe of the receive beam associated with the receiver node in the victim or aggressor wireless link, angles of departure for the interference at a transmitter node in the victim or aggressor wireless link, angular directions of sidelobes of a transmit beam associated with the transmitter node in the victim or aggressor wireless link, gains of a mainlobe of the transmit beam associated with the transmitter node in the victim or aggressor wireless link, combinations or variations of one or more of the same, and/or any other suitable information about the interference.

In one example, such measurements may represent and/or correspond to the amount of interference introduced from one link to another across the different scan settings while those nodes are implementing non-tapered codebook 318(1). In this example, controller 102 may determine whether any or all of those nodes are eligible for a tapered codebook based at least in part on the interference measurements and/or the corresponding information.

As a specific example, controller 102 may determine that receiver node 316 is eligible for the tapered codebook by analyzing the measurements and/or characteristics of interference 320. In this example, the analysis may indicate that (1) aggressor link 312 that communicatively couples transmitter node 314 and receiver node 316 together is strong enough to support a certain amount of signal loss (e.g., approximately 2 decibels of signal loss), (2) the INR for victim link 310 is above a certain interference threshold, and (3) the angle of arrival for interference 320 at receiver node 306 matches the angular direction of the sidelobe in the receive beam associated with receiver node 306. Accordingly, controller 102 may arrive at the determination that receiver node 316 is eligible for the tapered codebook due at least in part to the analysis indicating those characteristics of interference 320.

In one example, controller 102 may determine that aggressor link 312 is strong enough to support the certain amount of loss by (1) identifying the gain of the mainlobe of the transmit beam associated with transmitter node 314 and/or (2) determining or identifying the distance between transmitter node 314 and receiver node 316. In this example, controller 102 may determine that the gain of the mainlobe of the receive beam associated with receiver node 316 and the gain of the mainlobe of the transmit beam associated with transmitter node 314 are collectively able to sustain the aggressor link 312 across that distance despite the certain amount of signal loss that results from implementing the tapered codebook. Put more simply, controller 102 may determine that the gain of the mainlobe of the receive beam associated with receiver node 316 and the gain of the mainlobe of the transmit beam associated with transmitter node 314 collectively reach and/or exceed a threshold capable of accommodating the certain amount of signal loss.

As an opposing example, controller 102 may determine that receiver node 316 is not eligible for the tapered codebook by analyzing the measurements and/or characteristics of interference 320. In this example, the analysis may indicate that (1) aggressor link 312 that communicatively couples transmitter node 314 and receiver node 316 together is not strong enough to support a certain amount of signal loss (e.g., approximately 2 decibels of signal loss), (2) the INR for victim link 310 is not above a certain interference threshold, or (3) the angle of arrival for interference 320 at receiver node 306 does not match the angular direction of the sidelobe in the receive beam associated with receiver node 306. Accordingly, controller 102 may arrive at the determination that receiver node 316 is not eligible for the tapered codebook due at least in part to the analysis indicating those characteristics of interference 320.

In one example, controller 102 may determine that the aggressor link 312 is not strong enough to support the certain amount of loss by (1) identifying the gain of the mainlobe of the transmit beam associated with transmitter node 314 and/or (2) determining or identifying the distance between transmitter node 314 and receiver node 316. In this example, controller 102 may determine that the gain of the mainlobe of the receive beam associated with receiver node 316 and the gain of the mainlobe of the transmit beam associated with transmitter node 314 are collectively unable to sustain the aggressor link 312 across that distance due to the certain amount of signal loss that results from implementing the tapered codebook. Put more simply, controller 102 may determine that the gain of the mainlobe of the receive beam associated with receiver node 316 and the gain of the mainlobe of the transmit beam associated with transmitter node 314 fail to collectively reach and/or exceed a threshold capable of accommodating the certain amount of signal loss.

As another example, controller 102 may determine that transmitter node 314 is eligible for the tapered codebook by analyzing the measurements and/or characteristics of interference 320. In this example, the analysis may indicate that (1) aggressor link 312 that communicatively couples transmitter node 314 and receiver node 316 together is strong enough to support a certain amount of signal loss (e.g., approximately 2 decibels of signal loss), (2) the INR for victim link 310 is above a certain interference threshold, and (3) the angle of departure for interference 320 at transmitter node 314 matches the angular direction of sidelobe 330(2) in the transmit beam associated with transmitter node 314. Accordingly, controller 102 may arrive at the determination that transmitter node 314 is eligible for the tapered codebook due at least in part to the analysis indicating those characteristics of interference 320.

As another opposing example, controller 102 may determine that transmitter node 314 is not eligible for the tapered codebook by analyzing the measurements and/or characteristics of interference 320. In this example, the analysis may indicate that (1) aggressor link 312 that communicatively couples transmitter node 314 and receiver node 316 together is not strong enough to support a certain amount of signal loss (e.g., approximately 2 decibels of signal loss), (2) the INR for victim link 310 is not above a certain interference threshold, (3) the angle of departure for interference 320 at transmitter node 314 does not match the angular direction of sidelobe 330(2) in the transmit beam associated with transmitter node 314. Accordingly, controller 102 may arrive at the determination that transmitter node 314 is not eligible for the tapered codebook due at least in part to the analysis indicating those characteristics of interference 320.

In some examples, controller 102 may coordinate and/or perform IM scans in connection with several and/or all the wireless links that communicatively couple the nodes within the wireless network. For example, controller 102 may coordinate and/or perform IM scans that measure angles of arrival and/or angles of departure for interference signals in connection with aggressor link 312 and victim link 310. In this example, controller 102 may analyze interference 320 by applying an offline prediction algorithm that heuristically predicts angular directions and/or locations of sidelobes in transmit or receive beams associated with the nodes.

The location and/or position of sidelobes generated in the beamforming pattern may be determined, predicted, and/or simulated in a variety of ways. For example, controller 102 and/or one of the nodes included in the wireless network may apply a formula and/or equation to determine, predict, and/or simulate the location or position of such sidelobes. In this example, the formula and/or equation may demonstrate and/or characterize the response gain of such sidelobes and/or the effect of quantization. One such formula and/or equation may be represented as $$\tilde{A}(\phi, \gamma) = \sum_{k=-\infty}^{\infty} \frac{(-1)^k}{(1-2\pi k/\Delta)} \frac{\sin \Delta/2}{\Delta/2} \sum_{n=0}^{N-1} \sum_{m=0}^{M-1} e^{-j\alpha_{n,m}} e^{j\left(n\frac{2\pi}{\lambda}d_x \sin\phi\cos\gamma + m\frac{2\pi}{\lambda}d_y \sin\phi\sin\gamma - \left(\frac{2\pi k}{\Delta}\right)\alpha_{n,m}\right)} e^{-j\left(\frac{2\pi k}{\Delta}\right)\epsilon_{n,m}},$$

where $\tilde{A}$ represents the quantization power and/or response gain, $\alpha_{n,m}$ represents the progressive steering angle with infinite resolution for the ($n^{th}$, $m^{th}$) antenna element, $\phi_o$ represents the azimuth scan angle, $\gamma_o$ represents the elevation scan angle, $\epsilon_{n,m}$ represents the feedline delay for the ($n^{th}$, $m^{th}$) antenna element, and $\Delta$ represents the quantization interval or step (e.g., $$\Delta = 2\pi/2^q).$$

Moreover, $\alpha_{n,m}$ may be represented as n $2\pi/\lambda d_x$ sin $\phi_o$ cos $\gamma_o$+m $2\pi/\lambda d_y$ sin $\phi_o$ sin $\gamma_o$.

In one example, when k=0, the quantization operation may have no effect on the response. As a result, the high-level sidelobes caused by the quantization operation may originate and/or derive from the parasitic array responses (e.g., the replicas of k≠0). In this example, as k increases, the amplitude of the antenna array may attenuate significantly. For that reason, the first-order replicas (e.g., k=1 and k=−1) may be useful in predicting and/or estimating the locations of high-level sidelobes.

Accordingly, to predict and/or estimate the location of the first-order parasitic sidelobe of an antenna array, controller 102 may modify and/or simplify the above formula and/or equation to $$\phi = \sin^{-1}\left(\frac{1}{\cos\tilde{\gamma}}\left(\frac{i\lambda}{d_x} + \left(1 + \frac{2\pi}{\Delta}\right)\sin\alpha_0\right)\right), i = 0, \pm 1,$$

etc., for a given $\gamma$. Similarly, the response gain of the first-order parasitic sidelobe using feedline delay may be modified and/or simplified to $$\tilde{A}(\phi, \gamma) = C \sum_{n=0}^{N-1} \sum_{m=0}^{M-1} e^{j(h(n,m,\gamma)\alpha - h(n,m,\gamma_0)\beta_0 - \epsilon\tilde{}_{n,m})},$$

where $$h(n, m, \gamma) = n\frac{2\pi}{\lambda}d_x\cos\gamma + m\frac{2\pi}{\lambda}d_y\sin\gamma, \alpha = \sin\phi, \beta_0 = \left(1 + \frac{2\pi}{\Delta}\right)\sin\varphi_0,$$

and $$\epsilon\tilde{}_{n,m} = \left(\frac{2\pi}{\Delta}\right)\epsilon_{n,m}.$$

Further modification and/or simplification of this response gain formula may yield $$|\tilde{A}(\phi, \gamma)_{k=1}| = C\sqrt[2]{2NM + 2\sum_{i<j}\cos(x_i - x_j)}.$$

Unfortunately, in some examples, controller 102 may be unable to accurately predict the location of the parasitic sidelobe using the maximum amplitude for the first-order array response (e.g., k=1). One reason that controller 102 is unable to do so may be that the feedline delay causes a power spread such that no significant mainlobe occurs in the first-order array response, which corresponds to the first-order parasitic sidelobe. As a result, controller 102 may implement and/or apply a Monte Carlo simulation to evaluate the distribution of the sidelobes for a given antenna array. For example, controller 102 may generate 10,000 instances for each scan angle. In this example, controller 102 may randomly generate a feedline delay matrix for each of those 10,000 instances. The threshold for the corresponding sidelobes may be represented as |amplitude(sidelobe)−maximum amplitude|<15 decibels.

Figure 8:
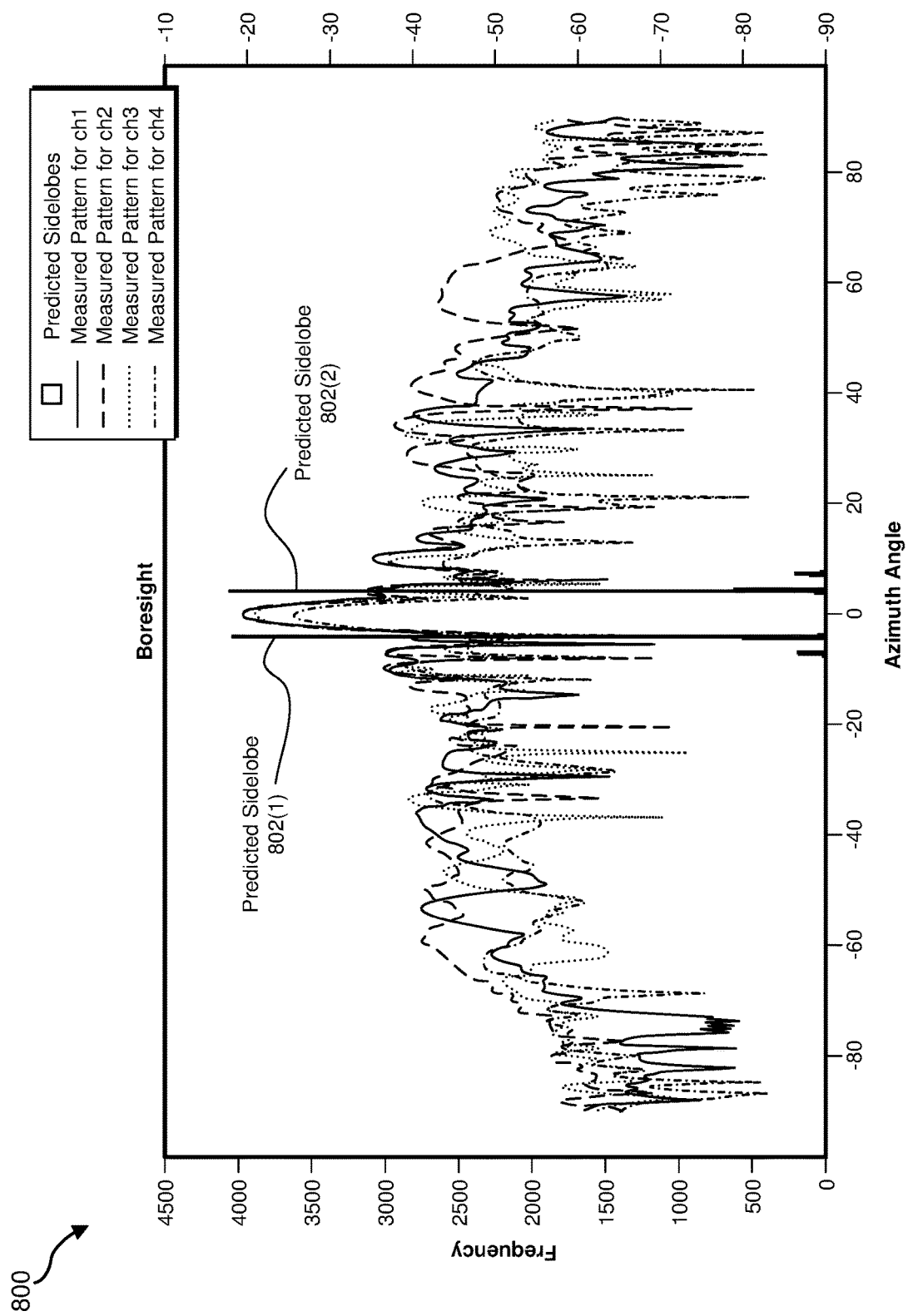
FIG. 8 is an illustration of an exemplary graph showing sidelobe predictions according to one or more embodiments of this disclosure.
Figure 9:
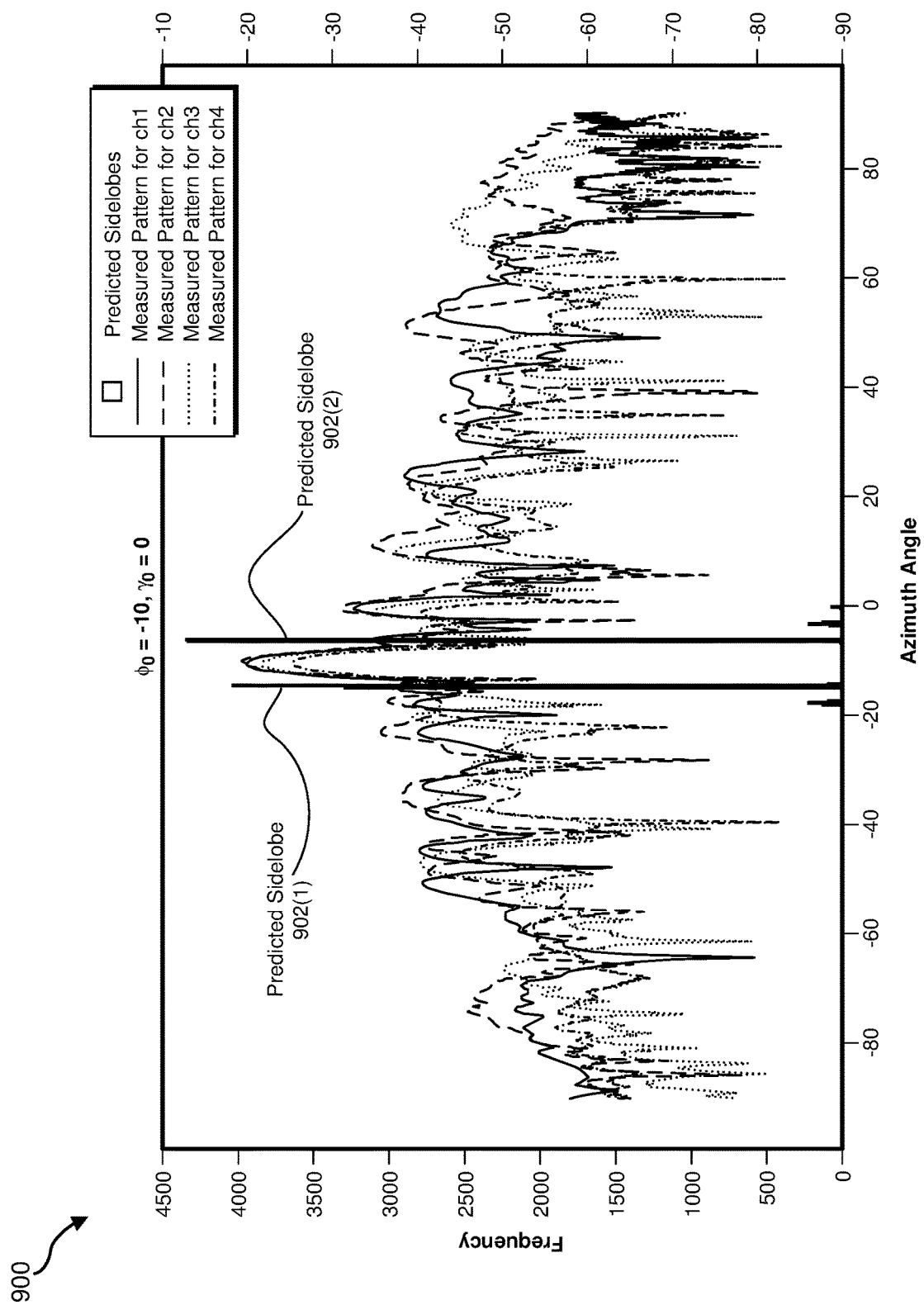
FIG. 9 is an illustration of an exemplary graph showing sidelobe predictions according to one or more embodiments of this disclosure.
Figure 10:
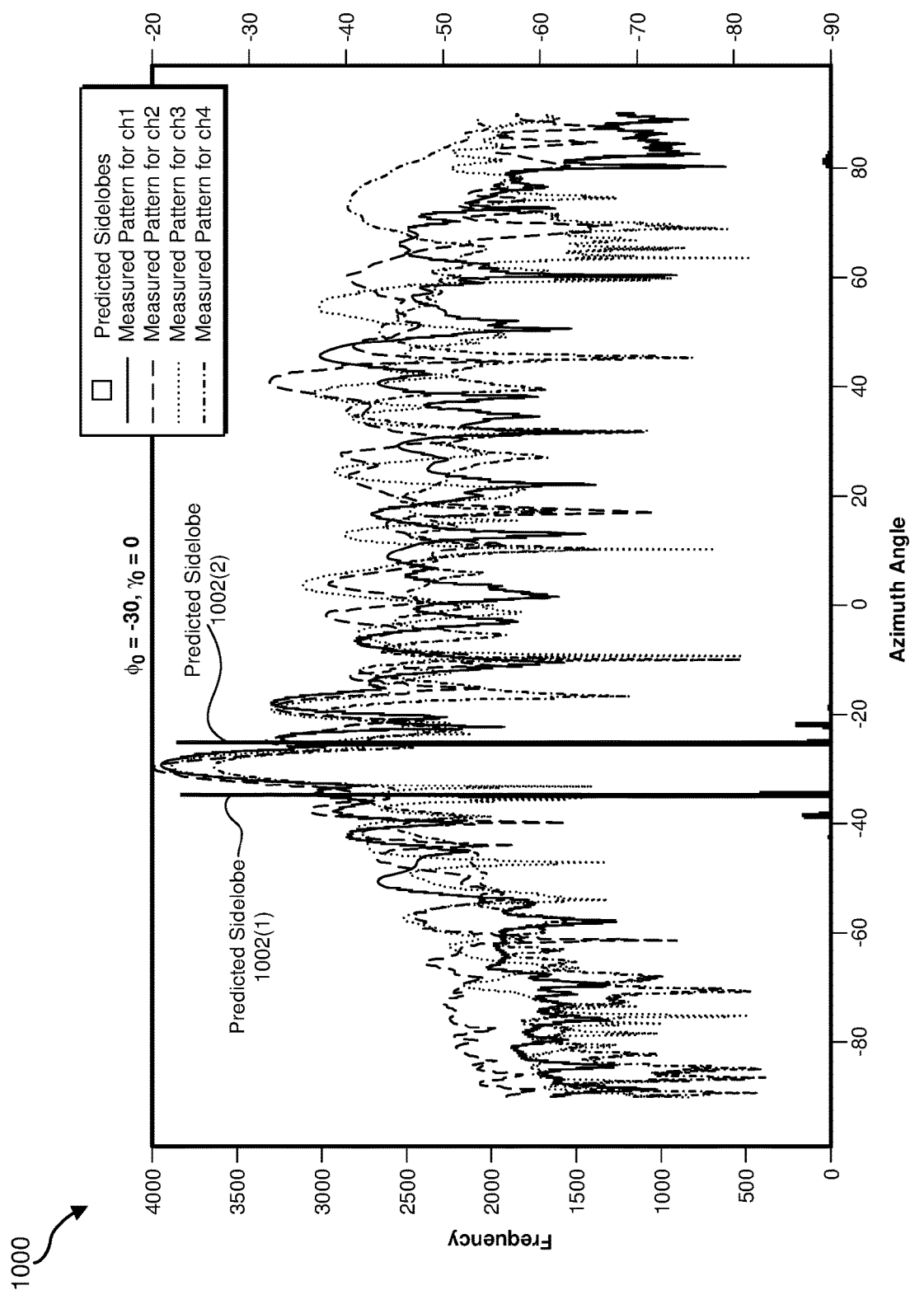
FIG. 10 is an illustration of exemplary graph showing sidelobe predictions according to one or more embodiments of this disclosure.

FIGS. 8, 9, and 10 illustrate exemplary graphs 800, 900, and 1000, respectively. As illustrated in FIG. 8, exemplary graph 800 may show and/or highlight predicted sidelobes 802(1) and 802(2) relative to various interference measurements obtained by controller 102. In one example, graph 800 may plot those interference measurements based on the frequencies of wireless signals versus the corresponding azimuth angles of the antenna array. Controller 102 may estimate the locations of predicted sidelobes 802(1) and 802(2) based at least in part on those interference measurements. In this example, graph 800 may indicate and/or demonstrate that predicted sidelobes 802(1) and 802(2) are located at approximately ±5 degrees relative to the azimuth angle and the boresight of the antenna array may be located at approximately zero degrees relative to the azimuth angle.

As illustrated in FIG. 9, exemplary graph 900 may show and/or highlight predicted sidelobes 902(1) and 902(2) relative to various interference measurements obtained by controller 102. In one example, graph 900 may plot those interference measurements based on the frequencies of wireless signals versus the corresponding azimuth angles of the antenna array. Controller 102 may estimate the locations of predicated sidelobes 902(1) and 902(2) based at least in part on those interference measurements. In this example, graph 900 may indicate and/or demonstrate that predicted sidelobes 902(1) and 902(2) are likely located at approximately −5 and −15 degrees relative to the azimuth angle and the boresight of the antenna array may be located at approximately −10 degrees relative to the azimuth angle.

As illustrated in FIG. 10, exemplary graph 1000 may show and/or highlight predicted sidelobes 1002(1) and 1002(2) relative to various interference measurements obtained by controller 102. In one example, graph 1000 may plot those interference measurements based on the frequencies of wireless signals versus the corresponding azimuth angles of the antenna array. Controller 102 may estimate the locations of predicated sidelobes 1002(1) and 1002(2) based at least in part on those interference measurements. In this example, graph 1000 may indicate and/or demonstrate that predicted sidelobes 1002(1) and 1002(2) are likely located at approximately −25 and −35 degrees relative to the azimuth angle and the boresight of the antenna array may be located at approximately −30 degrees relative to the azimuth angle.

Figure 4:
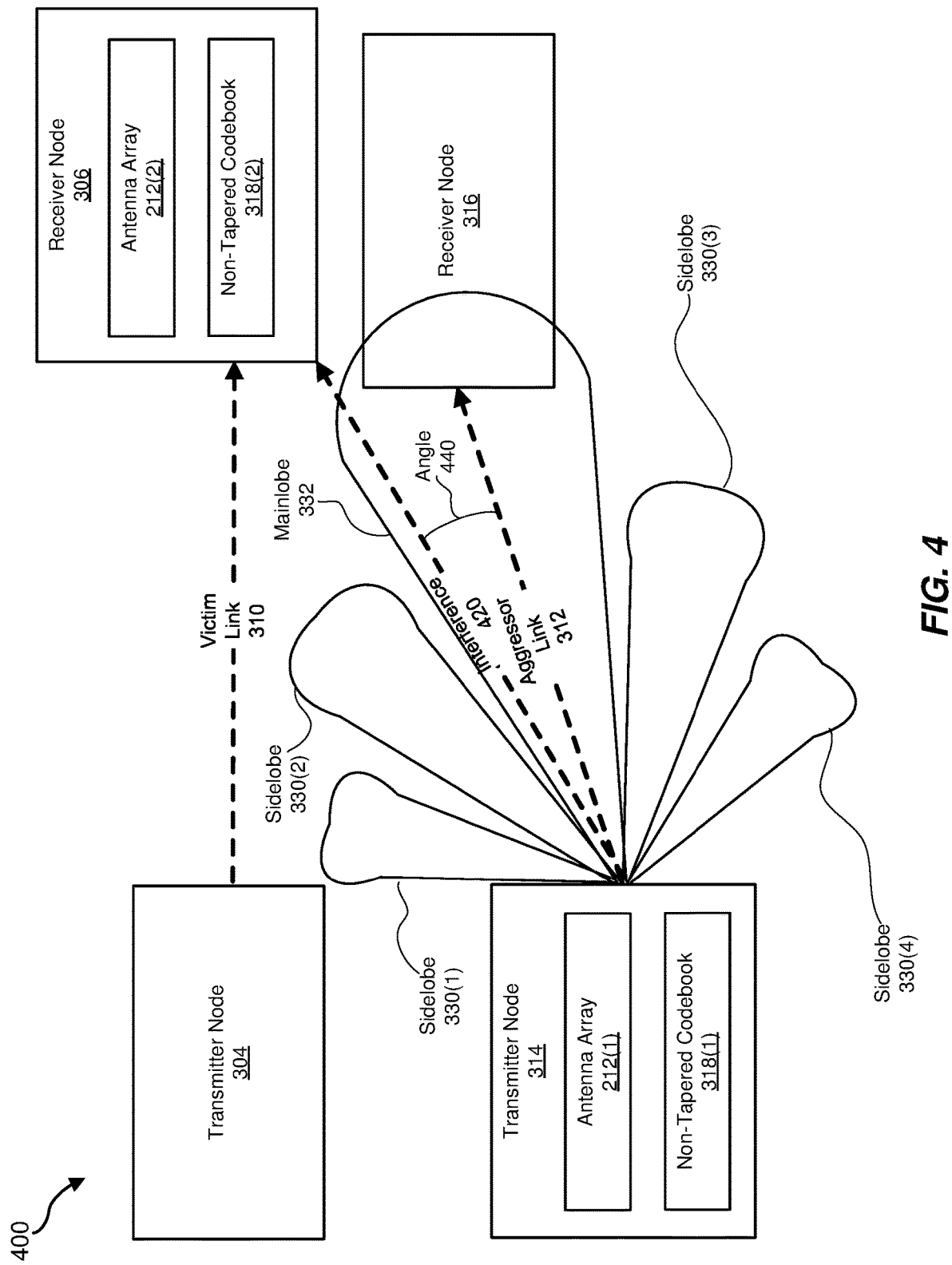
FIG. 4 is a block diagram of an exemplary system for adaptive beamforming in a wireless network according to one or more embodiments of this disclosure.

FIG. 4 illustrates an exemplary system 400 capable of facilitating adaptive beamforming in a wireless network. In some examples, system 400 may include and/or represent a specific configuration and/or arrangement of nodes 104(1)-(4) illustrated in FIG. 1. As illustrated in FIG. 4, system 400 may include and/or represent transmitter node 304 and receiver node 306 communicatively coupled via victim link 310. In addition, system 400 may include and/or represent a transmitter node 314 and a receiver node 316 communicatively coupled via an aggressor link 312.

In some examples, system 400 in FIG. 4 may demonstrate a configuration and/or arrangement in which the nodes are positioned and/or located such that an angle 440 forms between aggressor link 312 and interference 420. In one example, transmitter node 314 may generate and/or emit a beamforming pattern via antenna array 212(1). As illustrated in FIG. 4, mainlobe 332 may be directed toward receiver node 306 and/or may somewhat overlap interference 420. In this example, angle 440 between the directions of interference 420 and aggressor link 312 may be relatively small. As a result, mainlobe 332 may be the primary contributor to interference 420 among the beamforming pattern. Since the majority of the signal energy is contained within mainlobe 332 of the beamforming pattern, angle 440 being relatively small may strengthen and/or increase interference 420 and thus impair the performance of victim link 310 (compared to, e.g., angle 340 in FIG. 3).

In some examples, controller 102 may know, identify, and/or discover various characteristics about the nodes and/or their corresponding links. For example, the nodes may be fixed and/or secured at specific locations, and controller 102 may know, identify, and/or discover such locations. Additionally or alternatively, the antenna arrays of the nodes may be oriented and/or aimed in specific directions, and controller 102 may know, identify and/or discover such locations. Accordingly, the nodes and/or their antenna arrays may have relative angular relationships with one another, and controller 102 may know, identify, and/or discover such angular relationships and/or which nodes are wirelessly linked to one another via their antenna arrays.

In some examples, controller 102 may identify and/or determine which of the links is the aggressor and which of the links is the victim based at least in part on interference measurements. For example, controller 102 may determine that interference 420 and/or the corresponding INR is above or below a certain threshold. In this example, the INR may include and/or represent an estimate based on the aggressor node's maximum transmit power and/or average transmit power.

In one example, such measurements may represent and/or correspond to the amount of interference introduced from one link to another across the different scan settings while those nodes are implementing non-tapered codebook 318(1). In this example, controller 102 may determine whether any or all of those nodes are eligible for a tapered codebook based at least in part on the interference measurements and/or the corresponding information.

As a specific example, controller 102 may determine that receiver node 316 is eligible for the tapered codebook by analyzing the measurements and/or characteristics of interference 420. In this example, the analysis may indicate that (1) aggressor link 312 that communicatively couples transmitter node 314 and receiver node 316 together is strong enough to support a certain amount of signal loss (e.g., approximately 2 decibels of signal loss), (2) the INR for victim link 310 is above a certain interference threshold, and (3) the angle of arrival for interference 420 at receiver node 306 matches the angular direction of the sidelobe in the receive beam associated with receiver node 306. Accordingly, controller 102 may arrive at the determination that receiver node 316 is eligible for the tapered codebook due at least in part to the analysis indicating those characteristics of interference 420.

In one example, controller 102 may determine that the aggressor link 312 is strong enough to support the certain amount of loss by (1) identifying the gain of the mainlobe of the transmit beam associated with transmitter node 314 and/or (2) determining or identifying the distance between transmitter node 314 and receiver node 316. In this example, controller 102 may determine that the gain of the mainlobe of the receive beam associated with receiver node 316 and the gain of the mainlobe of the transmit beam associated with transmitter node 314 are collectively able to sustain the aggressor link 312 across that distance despite the certain amount of signal loss that results from implementing the tapered codebook. Put more simply, controller 102 may determine that the gain of the mainlobe of the receive beam associated with receiver node 316 and the gain of the mainlobe of the transmit beam associated with transmitter node 314 collectively reach and/or exceed a threshold capable of accommodating the certain amount of signal loss.

Figure 5:
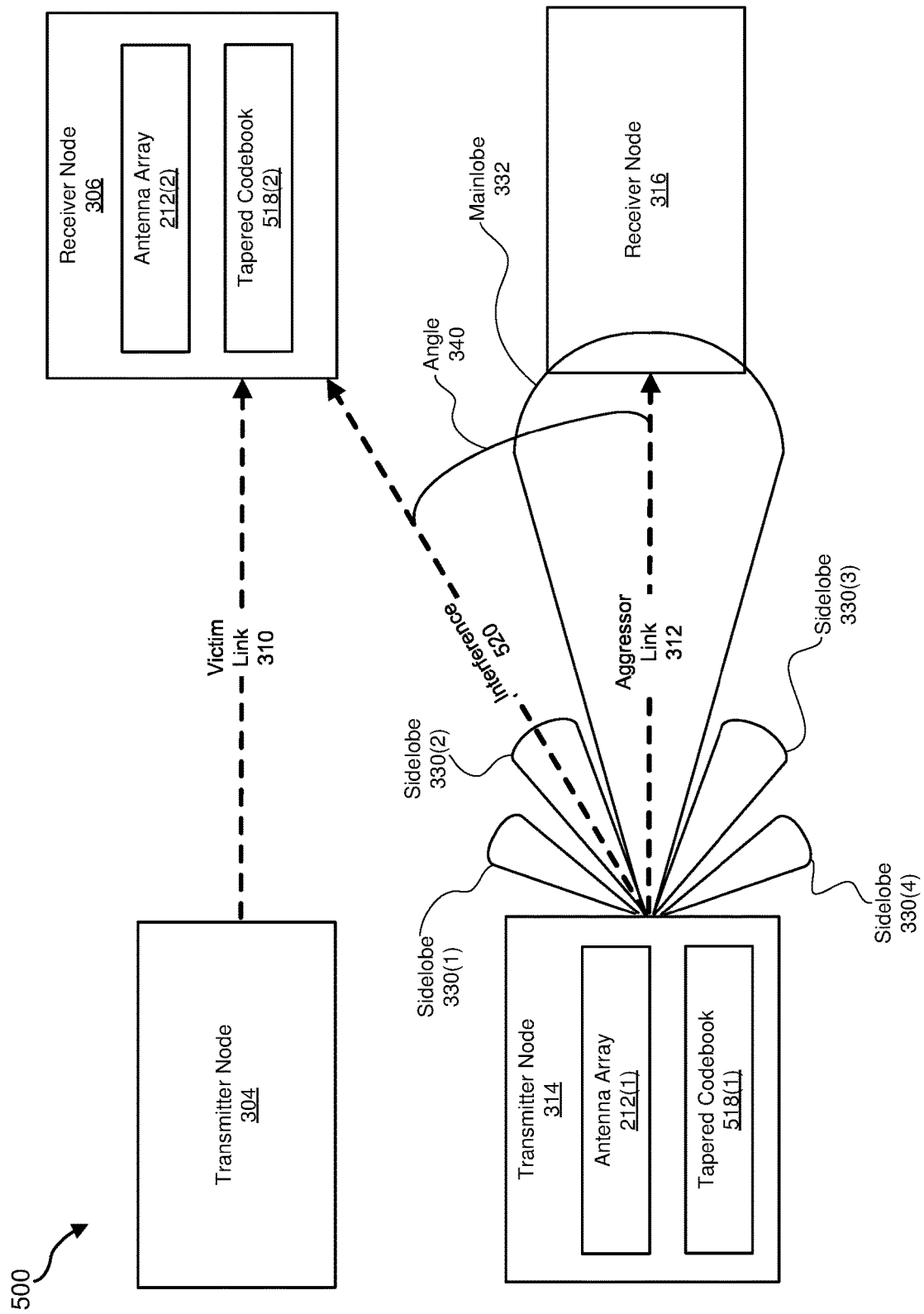
FIG. 5 is a block diagram of an exemplary system for adaptive beamforming in a wireless network according to one or more embodiments of this disclosure.

FIG. 5 illustrates an exemplary system 500 capable of facilitating adaptive beamforming in a wireless network. In some examples, system 500 may include and/or represent a specific configuration and/or arrangement of nodes 104(1)-(4) illustrated in FIG. 1. As illustrated in FIG. 5, system 500 may include and/or represent transmitter node 304 and receiver node 306 communicatively coupled via a victim link 310. In addition, system 500 may include and/or represent a transmitter node 314 and a receiver node 316 communicatively coupled via an aggressor link 312.

Some or all of the nodes in FIG. 5 may implement and/or apply a tapered codebook at the direction of controller 102. For example, after determining that transmitter node 314 is eligible for a tapered codebook 518(1), controller 102 may direct transmitter node 314 to switch from non-tapered codebook 318(1) to tapered codebook 518(1). In response to this direction from controller 102, transmitter node 314 may implement and/or apply tapered codebook 518(1). In this example, tapered codebook 518(1) may cause transmitter node 314 and/or antenna array 212(1) to beamform in a way that suppresses the sidelobes by approximately 17 decibels relative to non-tapered codebook 318(1). Accordingly, tapered codebook 318(1) may constitute and/or represent a traditional configuration that serves as a reference and/or baseline for the amount of sidelobe suppression achieved by a counterpart tapered codebook.

Additionally or alternatively, after determining that receiver node 306 is eligible for a tapered codebook 518(2), controller 102 may direct receiver node 306 to switch from non-tapered codebook 318(2) to tapered codebook 518(2). In response to this direction from controller 102, receiver node 306 may implement and/or apply tapered codebook 518(2). In this example, tapered codebook 518(2) may cause transmitter node 314 and/or antenna array 212(1) to beamform in a way that suppresses the sidelobes by approximately 17 decibels relative to non-tapered codebook 318(2).

In some examples, tapered codebooks 518(1) and 518(2) may sacrifice a certain amount of signal loss in the mainlobe of the transmit or receive beam fora certain amount of signal suppression in the sidelobes of the transmit or receive beam. Accordingly, upon implementation, tapered codebooks 518(1) and 518(2) may each cause their respective node to sacrifice that amount of signal loss in the mainlobe of the transmit or receive beam for the amount of signal suppression in the sidelobe of the transmit or receive beam.

In some examples, controller 102 may analyze interference 520 introduced by aggressor link 312 into victim link 310 while the nodes are implementing the tapered codebook. In one example, controller 102 may determine, based at least in part on the analysis of interference 520, that the SNR for aggressor link 312 that communicatively couples transmitter node 314 and receiver node 316 is below a certain signal threshold. In response to this determination, controller 102 may direct receiver node 316 to switch from the tapered codebook back to the non-tapered codebook. Additionally or alternatively, controller 102 may direct transmitter node 314 to switch from tapered codebook 518(1) back to non-tapered codebook 318(1).

Figure 6:
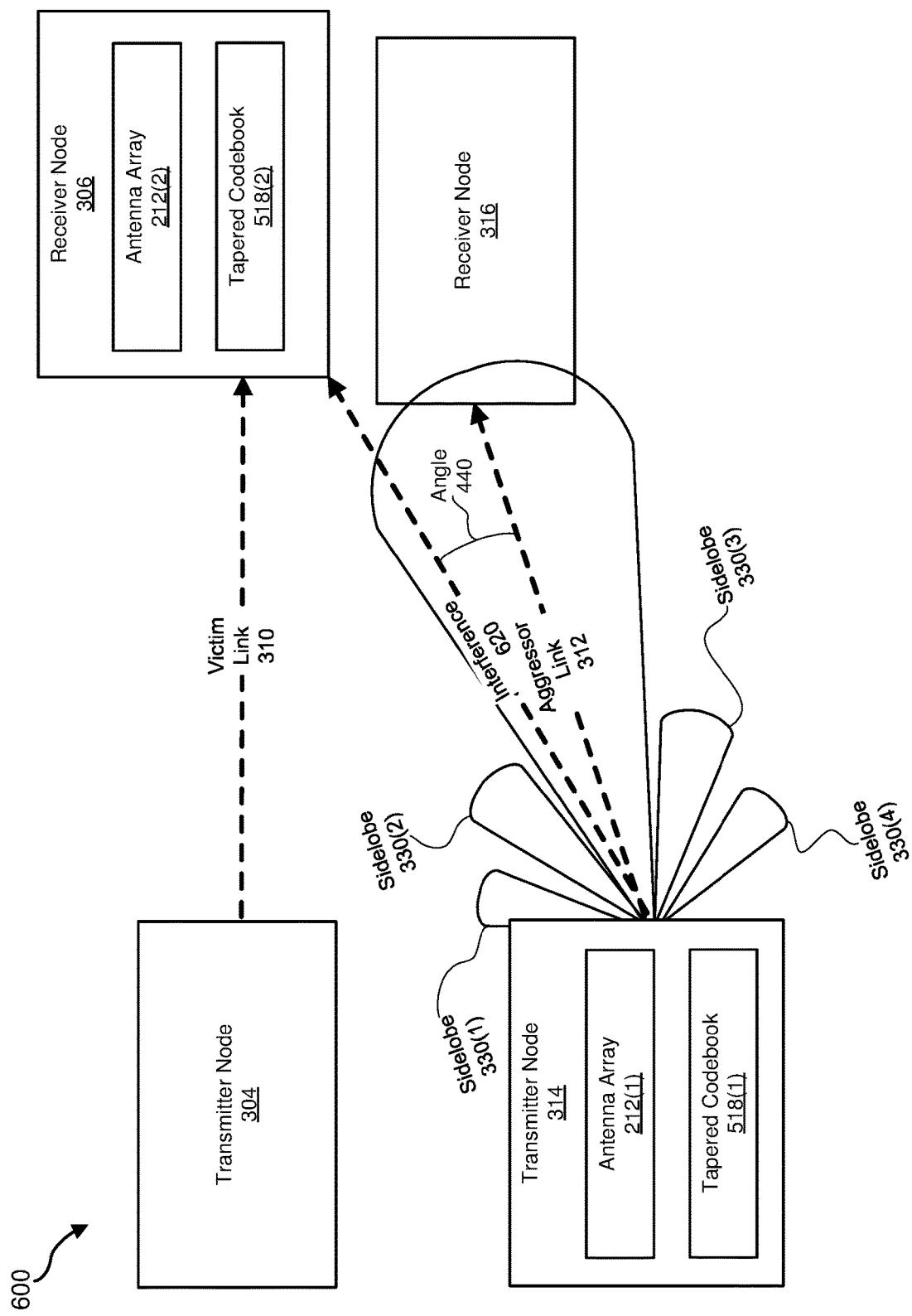
FIG. 6 is a block diagram of an exemplary system for adaptive beamforming in a wireless network according to one or more embodiments of this disclosure.

FIG. 6 illustrates an exemplary system 600 capable of facilitating adaptive beamforming in a wireless network. In some examples, system 600 may include and/or represent a specific configuration and/or arrangement of nodes 104(1)-(4) illustrated in FIG. 1. As illustrated in FIG. 6, system 600 may include and/or represent transmitter node 304 and receiver node 306 communicatively coupled via victim link 310. In addition, system 600 may include and/or represent transmitter node 314 and receiver node 316 communicatively coupled via aggressor link 312.

In some examples, controller 102 may analyze interference 620 introduced by aggressor link 312 into victim link 310 while the nodes are implementing the tapered codebook. In one example, controller 102 may determine, based at least in part on the analysis of interference 620, that the SNR for aggressor link 312 that communicatively couples transmitter node 314 and receiver node 316 is below a certain signal threshold. In response to this determination, controller 102 may direct receiver node 316 to switch from the tapered codebook back to the non-tapered codebook. Additionally or alternatively, controller 102 may direct transmitter node 314 to switch from tapered codebook 518(1) back to non-tapered codebook 318(1).

Figure 11:
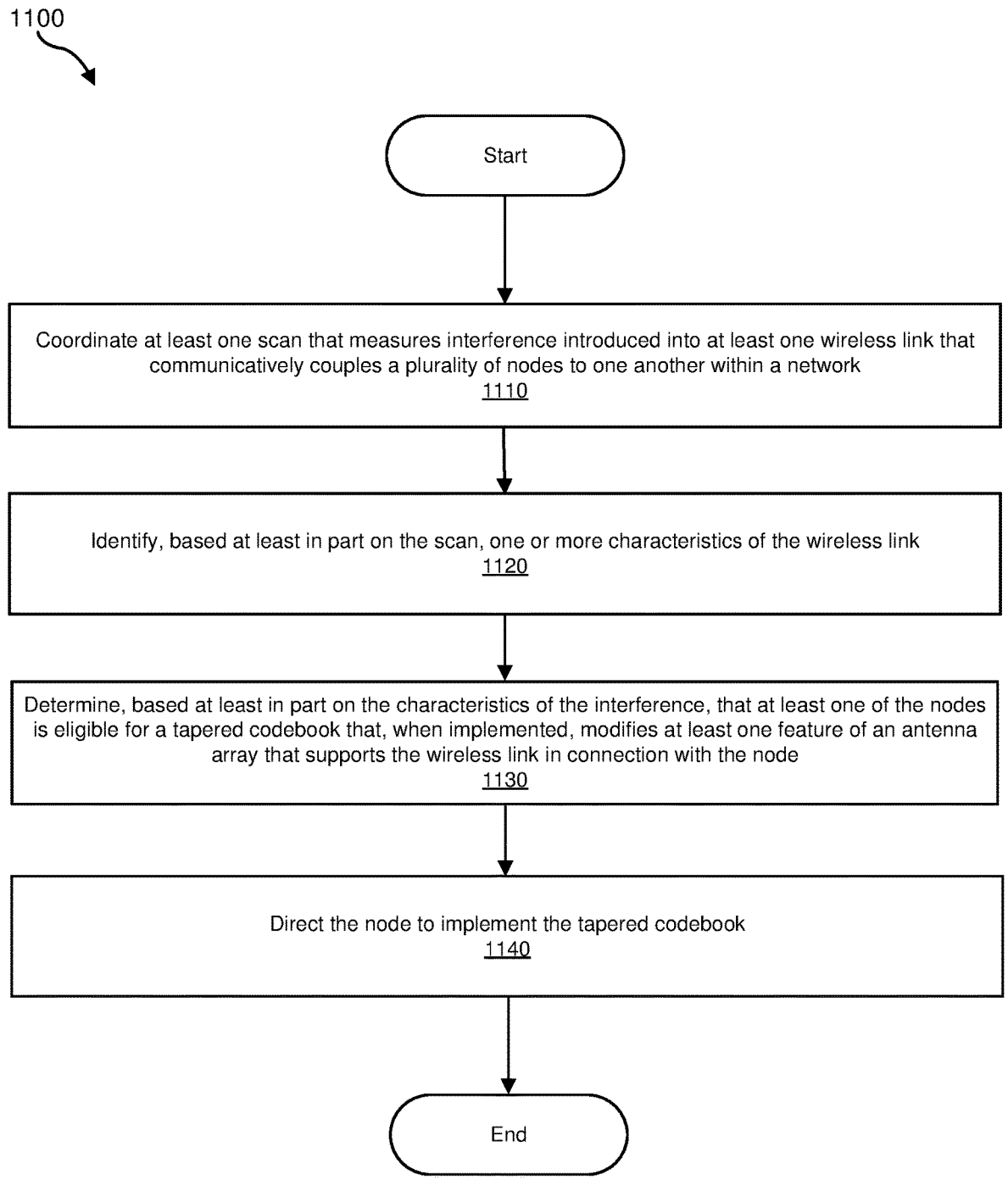
FIG. 11 is a flowchart of an exemplary method for adaptive beamforming in wireless networks.

FIG. 11 is a flow diagram of an exemplary method 1100 for adaptive beamforming in wireless networks. Method 1100 may include the step of coordinating at least one scan that measures interference introduced into at least one wireless link that communicatively couples a plurality of nodes to one another within a network (1110). Step 1110 may be performed in a variety of ways, including any of those described above in connection with FIGS. 1-10. For example, a controller within a network may coordinate one or more scans that measure interference introduced into wireless links that communicatively couples a plurality of nodes to one another within a network.

Method 1100 may also include the step of identifying one or more characteristics of the wireless link based at least in part on the scan (1120). Step 1120 may be performed in a variety of ways, including any of those described above in connection with FIGS. 1-10. For example, the controller may identify one or more characteristics of the wireless links based at least in part on the scans.

Method 1100 may further include the step of determining, based at least in part on the characteristics of the wireless link, that at least one of the nodes is eligible for a tapered codebook that, when implemented, modifies at least one feature of an antenna array that supports the wireless link in connection with the node (1130). Step 1130 may be performed in a variety of ways, including any of those described above in connection with FIGS. 1-10. For example, the controller may determine that some or all of the nodes are eligible for a tapered codebook that, when implemented, modifies certain features of their respective antenna arrays. In this example, the controller may make and/or arrive at this determination based at least in part on the characteristics of the wireless links.

Method 1100 may additionally include the step of directing the node to implement the tapered codebook in response to determining that the node is eligible for the tapered codebook (1140). Step 1140 may be performed in a variety of ways, including any of those described above in connection with FIGS. 1-10. For example, the controller may direct the nodes to implement the tapered codebook in response to determining that those nodes are eligible for the tapered codebook.

EXAMPLE EMBODIMENTS

Example 1: A system comprising a plurality of nodes communicatively coupled to one another via at least one wireless link and a controller communicatively coupled to at least one of the nodes, wherein the controller (1) coordinates at least one scan that measures interference introduced into the wireless link, (2) identifies, based at least in part on the scan, one or more characteristics of the wireless link, (3) determines, based at least in part on the characteristics of the wireless link, that the node is eligible for a tapered codebook that, when implemented, modifies at least one feature of an antenna array that supports the wireless link in connection with the node, and then (4) directs the node to implement the tapered codebook.

Example 2: The system of Example 1, wherein the feature of the antenna array comprises at least one of (1) an angular direction of at least one antenna tile included in the antenna array, (2) a beamformer associated with the antenna array, (3) a phase shifter associated with the antenna array, or (4) a gain controller associated with the antenna array.

Example 3: The system of either of Examples 1 and 2, wherein the tapered codebook comprises one or more instructions that cause the node to configure the antenna array in accordance with a certain antenna grouping scheme.

Example 4: The system of any of Examples 1-3, wherein the certain antenna grouping scheme enables the antenna array to suppress at least one sidelobe of the antenna array by approximately 17 decibels.

Example 5: The system of any of Examples 1-4, wherein the characteristics of the wireless link comprise at least one of (1) an interference-to-noise ratio for the wireless link, (2) a signal-to-noise ratio for the wireless link, (3) an angle of arrival for the interference at a receiver node included in the nodes, (4) an angular direction of at least one sidelobe of a receive beam associated with the receiver node included in the nodes, (5) a gain of a mainlobe of the receive beam associated with the receiver node included in the nodes, (6) an angle of departure for the interference at a transmitter node included in the nodes, (7) an angular direction of at least one sidelobe of a transmit beam associated with the transmitter node included in the nodes, or a gain of a mainlobe of the transmit beam associated with the transmitter node included in the nodes.

Example 6: The system of any of Examples 1-5, wherein (1) the wireless link comprises (A) a victim link that communicatively couples a transmitter node and a receiver node and (B) an aggressor link that communicatively couples an additional transmitter node and an additional receiver node, (2) the node that implements the tapered codebook comprises the additional receiver node communicatively coupled to the additional transmitter node via the aggressor link, and (3) the controller (A) analyzes the interference and (B) determines, based at least in part on the analysis of the interference, that (I) the aggressor link that communicatively couples the additional transmitter node and the additional receiver node is strong enough to support a certain amount of signal loss, (II) an interference-to-noise ratio for the victim link is above a certain interference threshold, and (Ill) an angle of arrival for the interference at the receiver node matches an angular direction of a sidelobe of a receive beam associated with the receiver node.

Example 7: The system of any of Examples 1-6, wherein, to determine that the aggressor link is strong enough to support the certain amount of loss, the controller (1) identifies a gain of a mainlobe of a transmit beam associated with the additional transmitter node, (2) identifies a distance between the additional transmitter node and the additional receiver node, and (3) determines that the gain of the mainlobe of the receive beam associated with the additional receiver node and the gain of the mainlobe of the transmit beam associated with the additional transmitter node are able to sustain the aggressor link across the distance despite the certain amount of signal loss.

Example 8: The system of any of Examples 1-7, wherein the certain amount of signal loss comprises a loss of approximately 2 decibels.

Example 9: The system of any of Examples 1-8, wherein the controller (1) determines, based at least in part on the analysis of the interference, that the signal-to-noise ratio for the aggressor link is below a certain signal threshold and then, in response to determining that the signal-to-noise ratio for the aggressor link is below the certain signal threshold, (2) directs the additional receiver node to switch from the tapered codebook to a non-tapered codebook that, when implemented, undoes the modification made to the feature of the antenna array that supports the aggressor link in connection with the receiver node, and (3) directs the additional transmitter node communicatively coupled to the additional receiver node via the aggressor link to implement the non-tapered codebook.

Example 10: The system of any of Examples 1-9, wherein (1) the wireless link comprises a plurality of wireless links that communicatively couple the nodes to one another within a network and (2) the controller (A) coordinates a plurality of scans that measure angles of arrival and angles of departure for interference signals in connection with the wireless links and (B) analyzes the interference by applying an offline prediction algorithm that heuristically predicts angular directions of sidelobes in transmit or receive beams associated with the nodes of the network.

Example 11: The system of any of Examples 1-10, wherein the offline prediction algorithm comprises a Monte Carlo algorithm.

Example 12: The system of any of Examples 1-11, wherein (1) the wireless link comprises (A) a victim link that communicatively couples a transmitter node and a receiver node and (B) an aggressor link that communicatively couples an additional transmitter node and an additional receiver node, (2) the node that implements the tapered codebook comprises the additional transmitter node communicatively coupled to the additional receiver node via the aggressor link, and (3) the controller (A) analyzes the interference and (B) determines, based at least in part on the analysis of the interference, that (I) the aggressor link that communicatively couples the additional transmitter node and the additional receiver node is strong enough to support a certain amount of signal loss, (II) an interference-to-noise ratio for the victim link is above a certain interference threshold, and (Ill) an angle of departure for the interference at the additional transmitter node matches the angular direction of a sidelobe of a transmit beam associated with the additional transmitter node.

Example 13: The system of any of Examples 1-12, wherein, to determine that the aggressor link is strong enough to support the certain amount of loss, the controller (1) identifies a gain of a mainlobe of a receive beam associated with the additional receiver node, (2) identifies a distance between the additional transmitter node and the additional receiver node, and (3) determines that the gain of the mainlobe of the receive beam associated with the additional receiver node and the gain of the mainlobe of the transmit beam associated with the additional transmitter node are able to sustain the aggressor link across the distance despite the certain amount of signal loss.

Example 14: The system of any of Examples 1-13, wherein the certain amount of signal loss comprises a loss of approximately 2 decibels.

Example 15: The system of any of Examples 1-14, wherein, prior to implementing the tapered codebook, the node implements a non-tapered codebook as a default configuration, wherein the non-tapered codebook does not sacrifice a certain amount of signal loss in a mainlobe of a transmit or receive beam for a certain amount of signal suppression in a sidelobe of the transmit or receive beam, the certain amount of signal loss in the mainlobe being less than the certain amount of signal suppression in the sidelobe.

Example 16: The smartwatch of any of Examples 1-15, wherein, upon implementation, the tapered codebook causes the node to sacrifice the certain amount of signal loss in the mainlobe of the transmit or receive beam for the certain amount of signal suppression in the sidelobe of the transmit or receive beam.

Example 17: A controller comprising (1) a communication system that supports communication with a plurality of nodes communicatively coupled to one another via at least one wireless link and (2) at least one physical processor communicatively coupled to the communication system, wherein the physical processor (A) coordinates at least one scan that measures interference introduced into the wireless link, (B) identifies, based at least in part on the scan, one or more characteristics of the wireless link, (C) determines, based at least in part on the characteristics of the wireless link, that at least one of the nodes is eligible for a tapered codebook that, when implemented, modifies at least one feature of an antenna array that supports the wireless link in connection with the node, and (D) directs the node to implement the tapered codebook.

Example 18: The controller of Example 17, wherein the feature of the antenna array comprises at least one of (1) an angular direction of at least one antenna tile included in the antenna array, (2) a beamformer associated with the antenna array, (3) a phase shifter associated with the antenna array, or (4) a gain controller associated with the antenna array.

Example 19: The controller of any of Examples 17 and 18, wherein the tapered codebook comprises one or more instructions that cause the node to configure the antenna array in accordance with a certain antenna grouping scheme.

Example 20: A method may comprise (1) coordinating at least one scan that measures interference introduced into at least one wireless link that communicatively couples a plurality of nodes to one another within a network, (2) identifying, based at least in part on the scan, one or more characteristics of the wireless link, (3) determining, based at least in part on the characteristics of the wireless link, that at least one of the nodes is eligible for a tapered codebook that, when implemented, modifies at least one feature of an antenna array that supports the wireless link in connection with the node, and in response to determining that the node is eligible for the tapered codebook, (4) directing the node to implement the tapered codebook.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

In some embodiments, one or more objects (e.g., data associated with sensors, and/or activity information) of a computing system may be associated with one or more privacy settings. These objects may be stored on or otherwise associated with any suitable computing system or application, such as, for example, a social-networking system, a client system, a third-party system, a messaging application, a photo-sharing application, a biometric data acquisition application, an artificial-reality application, and/or any other suitable computing system or application.

Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within an application (such as an artificial-reality application). When privacy settings for an object allow a particular user or other entity to access that object, the object may be described as being "visible" with respect to that user or other entity. As an example, a user of an artificial-reality application may specify privacy settings for a user-profile page that identify a set of users that may access the artificial-reality application information on the user-profile page, thus excluding other users from accessing that information. As another example, an artificial-reality application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for an object may specify a "blocked list" of users or other entities that should not be allowed to access certain information associated with the object. In some cases, the blocked list may include third-party entities. The blocked list may specify one or more users or entities for which an object is not visible.

Privacy settings associated with an object may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different objects of the same type associated with a user may have different privacy settings. In addition, one or more default privacy settings may be set for each object of a particular object-type.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
a plurality of nodes communicatively coupled to one another via at least one wireless link; and
a controller communicatively coupled to at least one of the nodes, wherein the controller:
coordinates at least one scan that measures interference introduced into the wireless link;
identifies, based at least in part on the scan, one or more characteristics of the wireless link;
determines, based at least in part on the characteristics of the wireless link, that the wireless link is able to sustain a certain amount of signal loss while supporting communication between the plurality of nodes;
determines, due at least in part to the wireless link being able to sustain the certain amount of signal loss while supporting the communication between the plurality of nodes, that the node is eligible for a tapered codebook that, when implemented, modifies at least one feature of an antenna array that supports the wireless link in connection with the node; and
directs the node to implement the tapered codebook.

2. The system of claim 1, wherein the feature of the antenna array comprises at least one of:
an angular direction of at least one antenna tile included in the antenna array;
a beamformer associated with the antenna array;
a phase shifter associated with the antenna array; or
a gain controller associated with the antenna array.

3. The system of claim 1, wherein the tapered codebook comprises one or more instructions that cause the node to configure the antenna array in accordance with a certain antenna grouping scheme.

4. The system of claim 3, wherein the certain antenna grouping scheme enables the antenna array to suppress at least one sidelobe of the antenna array by approximately 17 decibels.

5. The system of claim 1, wherein the characteristics of the wireless link comprise at least one of:
an interference-to-noise ratio for the wireless link;
a signal-to-noise ratio for the wireless link;
an angle of arrival for the interference at a receiver node included in the nodes;
an angular direction of at least one sidelobe of a receive beam associated with the receiver node included in the nodes;
a gain of a mainlobe of the receive beam associated with the receiver node included in the nodes;
an angle of departure for the interference at a transmitter node included in the nodes;
an angular direction of at least one sidelobe of a transmit beam associated with the transmitter node included in the nodes; or
a gain of a mainlobe of the transmit beam associated with the transmitter node included in the nodes.

6. The system of claim 1, wherein:
the wireless link comprises:
a victim link that communicatively couples a transmitter node and a receiver node; and
an aggressor link that communicatively couples an additional transmitter node and an additional receiver node;
the node that implements the tapered codebook comprises the additional receiver node communicatively coupled to the additional transmitter node via the aggressor link; and
to determine that the additional receiver node is eligible for the tapered codebook, the controller:
analyzes the interference; and
determines, based at least in part on the analysis of the interference, that:
the aggressor link that communicatively couples the additional transmitter node and the additional receiver node is strong enough to support the certain amount of signal loss;
an interference-to-noise ratio for the victim link is above a certain interference threshold; and
an angle of arrival for the interference at the receiver node matches an angular direction of a sidelobe of a receive beam associated with the receiver node.

7. The system of claim 6, wherein, to determine that the aggressor link is strong enough to support the certain amount of signal loss, the controller:
identifies a gain of a mainlobe of a transmit beam associated with the additional transmitter node;
identifies a distance between the additional transmitter node and the additional receiver node; and
determines that the gain of the mainlobe of the receive beam associated with the additional receiver node and the gain of the mainlobe of the transmit beam associated with the additional transmitter node are able to sustain the aggressor link across the distance despite the certain amount of signal loss.

8. The system of claim 7, wherein the certain amount of signal loss comprises a loss of approximately 2 decibels.

9. The system of claim 6, wherein the controller:
determines, based at least in part on the analysis of the interference, that a signal-to-noise ratio for the aggressor link is below a certain signal threshold; and
in response to determining that the signal-to-noise ratio for the aggressor link is below the certain signal threshold:
directs the additional receiver node to switch from the tapered codebook to a non-tapered codebook that, when implemented, undoes the modification made to the feature of the antenna array that supports the aggressor link in connection with the receiver node; and
directs the additional transmitter node communicatively coupled to the additional receiver node via the aggressor link to implement the non-tapered codebook.

10. The system of claim 1, wherein:
the wireless link comprises a plurality of wireless links that communicatively couple the nodes to one another within a network; and
the controller:

coordinates a plurality of scans that measure angles of arrival and angles of departure for interference signals in connection with the wireless links; and analyzes the interference signals by applying an offline prediction algorithm that heuristically predicts angular directions of sidelobes in transmit or receive beams associated with the nodes of the network.

11. The system of claim 10, wherein the offline prediction algorithm comprises a Monte Carlo algorithm.

12. The system of claim 1, wherein:

the wireless link comprises:
- a victim link that communicatively couples a transmitter node and a receiver node; and
- an aggressor link that communicatively couples an additional transmitter node and an additional receiver node;

the node that implements the tapered codebook comprises the additional transmitter node communicatively coupled to the additional receiver node via the aggressor link; and to determine that the additional transmitter node is eligible for the tapered codebook, the controller:
- analyzes the interference; and
- determines, based at least in part on the analysis of the interference, that:
  - the aggressor link that communicatively couples the additional transmitter node and the additional receiver node is strong enough to support the certain amount of signal loss;
  - an interference-to-noise ratio for the victim link is above a certain interference threshold; and
  - an angle of departure for the interference at the additional transmitter node matches an angular direction of a sidelobe of a transmit beam associated with the additional transmitter node.

13. The system of claim 12, wherein, to determine that the aggressor link is strong enough to support the certain amount of signal loss, the controller:
- identifies a gain of a mainlobe of a receive beam associated with the additional receiver node;
- identifies a distance between the additional transmitter node and the additional receiver node; and
- determines that the gain of the mainlobe of the receive beam associated with the additional receiver node and the gain of the mainlobe of the transmit beam associated with the additional transmitter node are able to sustain the aggressor link across the distance despite the certain amount of signal loss.

14. The system of claim 13, wherein the certain amount of signal loss comprises a loss of approximately 2 decibels.

15. The system of claim 1, wherein, prior to implementing the tapered codebook, the node implements a non-tapered codebook as a default configuration, wherein the non-tapered codebook does not sacrifice the certain amount of signal loss in a mainlobe of a transmit or receive beam for a certain amount of signal suppression in a sidelobe of the transmit or receive beam, the certain amount of signal loss in the mainlobe being less than the certain amount of signal suppression in the sidelobe.

16. The system of claim 15, wherein, upon implementation, the tapered codebook causes the node to sacrifice the certain amount of signal loss in the mainlobe of the transmit or receive beam for the certain amount of signal suppression in the sidelobe of the transmit or receive beam.

17. A controller comprising:
- a communication system that supports communication with a plurality of nodes communicatively coupled to one another via at least one wireless link; and
- at least one physical processor communicatively coupled to the communication system, wherein the physical processor:
  - coordinates at least one scan that measures interference introduced into the wireless link;
  - identifies, based at least in part on the scan, one or more characteristics of the wireless link;
  - determines, based at least in part on the characteristics of the wireless link, that the wireless link is able to sustain a certain amount of signal loss while supporting communication between the plurality of nodes;
  - determines, due at least in part to the wireless link being able to sustain the certain amount of signal loss while supporting the communication between the plurality of nodes, that at least one of the nodes is eligible for a tapered codebook that, when implemented, modifies at least one feature of an antenna array that supports the wireless link in connection with the node; and
  - directs the node to implement the tapered codebook.

18. The controller of claim 17, wherein the feature of the antenna array comprises at least one of:
- an angular direction of at least one antenna tile included in the antenna array;
- a beamformer associated with the antenna array;
- a phase shifter associated with the antenna array; or
- a gain controller associated with the antenna array.

19. The controller of claim 17, wherein the tapered codebook comprises one or more instructions that cause the node to configure the antenna array in accordance with a certain antenna grouping scheme.

20. A method comprising:
- coordinating at least one scan that measures interference introduced into at least one wireless link that communicatively couples a plurality of nodes to one another within a network;
- identifying, based at least in part on the scan, one or more characteristics of the wireless link;
- determining, based at least in part on the characteristics of the wireless link, that the wireless link is able to sustain a certain amount of signal loss while supporting communication between the plurality of nodes;
- determining, due at least in part to the wireless link being able to sustain the certain amount of signal loss while supporting the communication between the plurality of nodes, that at least one of the nodes is eligible for a tapered codebook that, when implemented, modifies at least one feature of an antenna array that supports the wireless link in connection with the node; and
- in response to determining that the node is eligible for the tapered codebook, directing the node to implement the tapered codebook.

* * * * *